(12) United States Patent
Sealey et al.

(10) Patent No.: US 8,974,636 B2
(45) Date of Patent: *Mar. 10, 2015

(54) COMPOSITION CONTAINING A MULTIVALENT CATIONIC METAL AND AMINE-CONTAINING ANTI-STATIC AGENT AND METHODS OF MAKING AND USING

(71) Applicant: International Paper Company, Memphis, TN (US)

(72) Inventors: James E. Sealey, Anderson, SC (US); Peter M. Froass, Mason, OH (US); Sylvie Marie Rita Carriere, West Chester, OH (US)

(73) Assignee: International Paper Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,963

(22) Filed: Jun. 13, 2013

(65) Prior Publication Data

US 2013/0333853 A1 Dec. 19, 2013

Related U.S. Application Data

(63) Continuation of application No. 13/184,756, filed on Jul. 18, 2011, now Pat. No. 8,465,624.

(60) Provisional application No. 61/365,823, filed on Jul. 20, 2010.

(51) Int. Cl.
| | | |
|---|---|---|
| C04B 16/02 | (2006.01) | |
| D21H 17/07 | (2006.01) | |
| D21H 17/63 | (2006.01) | |
| D21H 17/66 | (2006.01) | |
| D21H 21/14 | (2006.01) | |
| D21H 17/00 | (2006.01) | |
| D21H 15/04 | (2006.01) | |
| C04B 18/24 | (2006.01) | |
| D21C 9/00 | (2006.01) | |
| C04B 40/00 | (2006.01) | |
| D21H 11/16 | (2006.01) | |
| D21H 21/22 | (2006.01) | |
| C04B 103/46 | (2006.01) | |

(52) U.S. Cl.
CPC ........... *D21H 17/74* (2013.01); *D21H 17/07* (2013.01); *D21H 11/16* (2013.01); *D21H 15/04* (2013.01); *C04B 18/241* (2013.01); *D21C 9/007* (2013.01); *D21H 21/22* (2013.01); *C04B 40/0039* (2013.01); *C04B 2103/46* (2013.01); *D21H 17/66* (2013.01)
USPC ..... 162/164.6; 162/135; 162/158; 162/181.3; 162/181.1; 162/181.2; 162/184; 162/185; 162/231

(58) Field of Classification Search
USPC ............ 162/13, 135, 136, 158, 164.1, 164.6, 162/166, 168.1–168.2, 181.1–181.5, 162/183–185, 231; 604/367, 372, 374
See application file for complete search history.

(56) References Cited

U.S. PATENT DOCUMENTS

| | | |
|---|---|---|
| 3,395,708 A | 8/1968 | Hervey et al. |
| 3,554,862 A | 1/1971 | Hervey et al. |
| 3,627,630 A | 12/1971 | Gagnon |
| 3,819,470 A | 6/1974 | Shaw et al. |
| 3,903,889 A | 9/1975 | Torr |
| 4,022,965 A | 5/1977 | Goheen et al. |
| 4,075,136 A | 2/1978 | Schaper |
| 4,081,316 A | 3/1978 | Aberg et al. |
| 4,089,647 A | 5/1978 | Mockli |
| 4,144,122 A | 3/1979 | Emanuelsson et al. |
| 4,166,894 A | 9/1979 | Schaper |
| 4,174,417 A | 11/1979 | Rydell |
| 4,383,834 A | 5/1983 | Degen et al. |
| 4,394,212 A | 7/1983 | Pociluyko |
| 4,425,186 A | 1/1984 | May et al. |
| 4,431,481 A | 2/1984 | Drach et al. |
| 4,439,271 A | 3/1984 | Samuelson |
| 4,496,427 A | 1/1985 | Davison |
| 4,720,383 A | 1/1988 | Drach et al. |
| 4,777,736 A | 10/1988 | VanOursouw et al. |
| 4,973,382 A | 11/1990 | Kinn et al. |
| 4,986,882 A | 1/1991 | Mackey et al. |
| 5,049,235 A | 9/1991 | Barcus et al. |
| 5,061,344 A | 10/1991 | Wedin et al. |
| 5,068,009 A | 11/1991 | Jokinen et al. |
| 5,160,789 A | 11/1992 | Barcus et al. |
| 5,209,953 A | 5/1993 | Grupe et al. |
| 5,225,047 A | 7/1993 | Graef et al. |
| 5,231,122 A | 7/1993 | Palumbo et al. |
| 5,266,250 A | 11/1993 | Kroyer |
| 5,350,370 A | 9/1994 | Jackson et al. |
| 5,360,420 A | 11/1994 | Cook et al. |
| 5,402,938 A | 4/1995 | Sweeney |
| 5,443,899 A | 8/1995 | Barcus et al. |

(Continued)

FOREIGN PATENT DOCUMENTS

| | | |
|---|---|---|
| CN | 101349030 | 1/2009 |
| CN | 101575820 | 11/2009 |

(Continued)

OTHER PUBLICATIONS

Polyethyleneimine (PEI), Mini-Encyclopedia of Papermaking Wet-End Chemistry, Dept. of Wood and Paper Science, NC State University, No Date, 2 pages, [online], retrieved from the Internet, [retrieved Jan. 8, 2014], <URL: http://www4.ncsu.edu/~hubbe/PEI.htm>.*
Smook, Gary A., Handbook of Pulp and Paper Terminology, Angus Wilde Publications, 1990, p. 51 and 85 the definition of fluff pulp.

(Continued)

*Primary Examiner* — Dennis Cordray
(74) *Attorney, Agent, or Firm* — Thomas W. Barnes, III

(57) ABSTRACT

A fluff pulp or other pulp, comprises a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof; an amine-containing anti-static agent; and pulp. Methods of making and using the pulp, as well as articles therefrom, are provided.

21 Claims, 17 Drawing Sheets

(56) References Cited

U.S. PATENT DOCUMENTS

| | | | |
|---|---|---|---|
| 5,447,603 A | 9/1995 | Michalowski et al. | |
| 5,492,759 A * | 2/1996 | Eriksson et al. | 428/375 |
| 5,496,626 A | 3/1996 | Hamajima et al. | |
| 5,516,569 A | 5/1996 | Veith et al. | |
| 5,531,728 A | 7/1996 | Lash | |
| 5,601,921 A | 2/1997 | Eriksson | |
| 5,662,773 A | 9/1997 | Frederick et al. | |
| 5,667,637 A | 9/1997 | Jewell et al. | |
| 5,698,074 A | 12/1997 | Barcus et al. | |
| 5,698,688 A | 12/1997 | Smith et al. | |
| H1704 H | 1/1998 | Wallajapet et al. | |
| 5,720,737 A | 2/1998 | Hamajima et al. | |
| 5,731,080 A | 3/1998 | Cousin et al. | |
| 5,780,616 A | 7/1998 | Fornasari et al. | |
| 5,851,672 A | 12/1998 | Wang et al. | |
| 5,865,822 A | 2/1999 | Hamajima et al. | |
| 6,020,278 A | 2/2000 | Gatenholm | |
| 6,059,924 A | 5/2000 | Hoskins | |
| 6,074,524 A | 6/2000 | Wu et al. | |
| 6,086,950 A | 7/2000 | Masaki et al. | |
| H1909 H | 11/2000 | Ahr | |
| 6,146,494 A | 11/2000 | Seger et al. | |
| 6,153,003 A | 11/2000 | Lee et al. | |
| 6,159,335 A | 12/2000 | Owens et al. | |
| 6,162,329 A | 12/2000 | Vinson et al. | |
| 6,228,217 B1 | 5/2001 | Dickerson et al. | |
| 6,228,223 B1 | 5/2001 | Thebrin et al. | |
| 6,248,879 B1 | 6/2001 | Anderson et al. | |
| 6,296,737 B1 | 10/2001 | Wu et al. | |
| 6,340,408 B1 | 1/2002 | Norlander | |
| 6,361,651 B1 | 3/2002 | Sun | |
| 6,417,425 B1 | 7/2002 | Whitmore et al. | |
| 6,419,790 B1 | 7/2002 | Leege et al. | |
| 6,458,343 B1 | 10/2002 | Zeman et al. | |
| 6,471,824 B1 | 10/2002 | Jewell | |
| 6,506,282 B2 | 1/2003 | Hu et al. | |
| 6,533,898 B2 | 3/2003 | Gross | |
| 6,579,414 B2 | 6/2003 | Jewell | |
| 6,579,415 B2 | 6/2003 | Jewell | |
| 6,582,557 B2 | 6/2003 | Jewell | |
| 6,592,712 B2 | 7/2003 | Koukoulas et al. | |
| 6,592,717 B2 | 7/2003 | Jewell | |
| 6,603,054 B2 | 8/2003 | Chen et al. | |
| 6,667,424 B1 | 12/2003 | Hamilton et al. | |
| 6,692,603 B1 | 2/2004 | Lindsay et al. | |
| 6,770,576 B2 | 8/2004 | Cook et al. | |
| 6,808,790 B2 | 10/2004 | Chen et al. | |
| 6,811,879 B2 | 11/2004 | Dezutter et al. | |
| 6,837,970 B2 | 1/2005 | Ko et al. | |
| 6,893,473 B2 | 5/2005 | Neogi et al. | |
| 6,909,028 B1 | 6/2005 | Shawver et al. | |
| 6,918,992 B1 | 7/2005 | Strandberg et al. | |
| 6,930,221 B1 | 8/2005 | Strandqvist | |
| 7,175,741 B2 | 2/2007 | West et al. | |
| 7,252,868 B2 | 8/2007 | Suda et al. | |
| 7,265,258 B2 | 9/2007 | Hamilton et al. | |
| 7,334,347 B2 | 2/2008 | Mann et al. | |
| 7,344,593 B2 | 3/2008 | Luo et al. | |
| 7,407,615 B2 | 8/2008 | Hohn | |
| 7,442,279 B2 | 10/2008 | Hermans et al. | |
| 7,479,578 B2 | 1/2009 | Garnier et al. | |
| 7,592,391 B2 | 9/2009 | Calhoun et al. | |
| 8,328,988 B2 * | 12/2012 | Champion et al. | 162/164.6 |
| 8,465,624 B2 * | 6/2013 | Sealey et al. | 162/181.3 |
| 8,535,482 B2 * | 9/2013 | Jiang et al. | 162/164.1 |
| 8,613,836 B2 * | 12/2013 | Sealey et al. | 162/181.9 |
| 2002/0096276 A1 | 7/2002 | Leithem et al. | |
| 2002/0099347 A1 | 7/2002 | Chen et al. | |
| 2003/0034137 A1 | 2/2003 | Neogi et al. | |
| 2003/0139716 A1 | 7/2003 | Falk | |
| 2004/0122389 A1 | 6/2004 | Mace et al. | |
| 2004/0123483 A1 | 7/2004 | Vrbanac et al. | |
| 2005/0137547 A1 | 6/2005 | Didier Garnier et al. | |
| 2005/0252629 A1 * | 11/2005 | Laleg | 162/158 |
| 2006/0008621 A1 | 1/2006 | Gusky et al. | |
| 2006/0118258 A1 | 6/2006 | Chmielewski et al. | |
| 2006/0137838 A1 | 6/2006 | Luo et al. | |
| 2006/0137842 A1 | 6/2006 | Garnier et al. | |
| 2006/0173432 A1 | 8/2006 | Laumer et al. | |
| 2006/0184147 A1 | 8/2006 | Hamed | |
| 2006/0246186 A1 | 11/2006 | Nowak et al. | |
| 2006/0260773 A1 | 11/2006 | Tan et al. | |
| 2007/0083018 A1 | 4/2007 | Liu et al. | |
| 2007/0112319 A1 * | 5/2007 | Guidotti | 604/374 |
| 2007/0218256 A1 | 9/2007 | Tani | |
| 2007/0265469 A1 | 11/2007 | Cowman et al. | |
| 2007/0277947 A1 | 12/2007 | Nguyen | |
| 2008/0073043 A1 | 3/2008 | Greschik et al. | |
| 2008/0082069 A1 | 4/2008 | Qin et al. | |
| 2009/0124989 A1 | 5/2009 | Wastlund-Karlsson et al. | |
| 2010/0311296 A1 | 12/2010 | Bochmer et al. | |
| 2011/0030908 A1 | 2/2011 | Sealey et al. | |
| 2011/0034891 A1 | 2/2011 | Jiang et al. | |
| 2011/0108227 A1 | 5/2011 | Sealey et al. | |
| 2012/0048493 A1 | 3/2012 | Sealey | |
| 2012/0073773 A1 | 3/2012 | Jehn-Rendu et al. | |
| 2013/0139980 A1 | 6/2013 | Ban et al. | |

FOREIGN PATENT DOCUMENTS

| | | |
|---|---|---|
| CN | 101586287 | 11/2009 |
| EA | 302 | 4/1999 |
| EP | 0132128 | 1/1985 |
| EP | 0225940 | 12/1985 |
| EP | 184603 | 6/1986 |
| EP | 399564 | 11/1990 |
| EP | 896045 | 2/1999 |
| EP | 1217120 | 6/2002 |
| EP | 1548165 | 6/2005 |
| GB | 301682 | 12/1928 |
| GB | 868651 | 5/1961 |
| GB | 1180801 | 2/1970 |
| GB | 1367670 | 9/1974 |
| GB | 1489520 | 10/1977 |
| GB | 1550880 | 8/1979 |
| KG | 254 | 9/1998 |
| RU | 94044678 | 6/1996 |
| RU | 2129486 | 4/1999 |
| RU | 2150543 | 6/2000 |
| RU | 21793 | 2/2002 |
| RU | 2201257 | 3/2003 |
| RU | 2264453 | 11/2005 |
| RU | 2277071 | 5/2006 |
| RU | 2339518 | 11/2008 |
| SU | 1033616 | 8/1983 |
| SU | 1656032 | 6/1991 |
| WO | 8902952 | 4/1989 |
| WO | 9000213 | 1/1990 |
| WO | 9105106 | 4/1991 |
| WO | 9316228 | 8/1993 |
| WO | 9412725 | 6/1994 |
| WO | 9415766 | 7/1994 |
| WO | 9522655 | 8/1995 |
| WO | 9602697 | 2/1996 |
| WO | 9640601 | 12/1996 |
| WO | 9722744 | 6/1997 |
| WO | WO 98/19012 A1 * | 5/1998 |
| WO | 2006060221 | 6/2006 |
| WO | 2006119392 | 11/2006 |
| WO | 2007027966 | 3/2007 |
| WO | 2008058563 | 5/2008 |
| WO | 2011017532 | 2/2011 |
| WO | 2011017541 | 2/2011 |
| WO | 2012012633 | 1/2012 |

OTHER PUBLICATIONS

Air Floatation Drying, product sheet, Global Technologies, LLC online, 2008, retrieved from the Internet Retrieved Oct. 30, 2012, URL, http.www.globaltechllc.com-airfloat.html.

Smook, Gary A., Handbook of Pulp and Paper Terminology, Angus Wilde Publications, 1990, pp. 90, 163, 171, 176, 195, 205, and 206.

* cited by examiner

Figure 2: Handsheet Study Fluff Properties

| Sample ID | Shred Energy, kJ/kg | % Fines | % Good | % Fiber agglom. (Nits) | % Pieces | Spec. Vol., cc/g | Abs. Time, sec | Abs. Cap., g/g | Abs. Rate, cm/sec |
|---|---|---|---|---|---|---|---|---|---|
| PN Control | 210.5 | 13.0 | 62.4 | 14.9 | 9.7 | 19.9 | 2.0 | 9.0 | 1.6 |
| 0.3#/t 61067 Cpam | 199.0 | 17.4 | 60.2 | 13.3 | 9.1 | 19.9 | 1.8 | 9.1 | 1.8 |
| 0.5#/t 614 | 210.7 | 16.7 | 61.5 | 12.7 | 9.1 | 19.8 | 1.8 | 9.0 | 1.9 |
| 0.5#/t 614 + 1#/t 505 | 200.0 | 16.7 | 59.5 | 13.7 | 10.1 | 19.1 | 1.8 | 9.1 | 1.9 |
| 1#/t 505 | 208.3 | 18.2 | 62.3 | 11.6 | 7.9 | 20.0 | 2.0 | 9.2 | 1.5 |
| 20#/t Alum + 1#/t 505 | 198.6 | 19.1 | 64.2 | 12.4 | 4.3 | 18.8 | 1.8 | 9.3 | 1.7 |
| 20#/t Alum + 1#/t 5031 | 207.5 | 18.3 | 63.1 | 12.9 | 5.7 | 17.9 | 1.8 | 9.2 | 1.6 |

Figure 3: Handsheet Properties Sheet Properties

| Sample ID | Mullen PSI | Bulk cm³/g | Burst Index Mean kPa.m²/g |
|---|---|---|---|
| PN Control | 405 | 2.11 | 3.17 |
| 0.3#/t 61067 Cpam | 397 | 2.07 | 3.12 |
| 0.5#/t 614 | 404 | 2.25 | 3.17 |
| 0.5#/t 614 + 1#/t 505 | 398 | 1.97 | 3.13 |
| 1#/t 505 | 372 | 2.05 | 2.93 |
| 20#/t Alum + 1#/t 505 | 362 | 2.11 | 2.82 |
| 20#/t Alum + 1#/t 5031 | 392 | 2.29 | 3.05 |

Figure 4: Airlaid Line Shred Energy and Shred Quality with 4mm Screen

| Sample | Amps | KW | %Fines | % Good | % Nits | % Pieces | Mullen PSI | Screen Size |
|---|---|---|---|---|---|---|---|---|
| PN SSP | 42.0 | 21.0 | 28 | 70 | 1 | 1 | 194 | 4mm |
| RW 160 | 42.0 | 21.0 | 29 | 69 | 0 | 1 | 155 | 4mm |
| PN AS Trial #1 | 38.5 | 19.0 | 26 | 72 | 1 | 0 | 176 | 4mm |
| PN AS Trial #2 | 37.0 | 18.0 | 27 | 72 | 1 | 0 | 163 | 4mm |
| PN AS Trial #3 | 38.0 | 18.5 | 32 | 67 | 1 | 0 | 158 | 4mm |

Figure 5: Airlaid Line Shred Energy and Shred Quality with 8mm Screen

| Sample | Amps | KW | Mullen PSI | % Fines | % Good | % Nits | % Pieces | Screen Size |
|---|---|---|---|---|---|---|---|---|
| PN SSP | 36.0 | 17.0 | 194 | 24 | 71 | 4 | 1 | 8mm |
| RW 160 | 34.0 | 16.0 | 155 | 30 | 69 | 1 | 0 | 8mm |
| PN AS Trial #1 | 35.5 | 16.5 | 176 | 21 | 71 | 5 | 2 | 8mm |
| PN AS Trial #2 | 35.5 | 16.5 | 163 | 27 | 72 | 1 | 0 | 8mm |
| PN AS Trial #3 | 35.5 | 16.5 | 158 | 24 | 72 | 3 | 0 | 8mm |

Figure 6: Airlaid Line Shred Energy and Shred Quality with no Screen

| Sample | Amps | KW | % Fines | % Good | % Nits | % Pieces | Mullen PSI | Screen Size |
|---|---|---|---|---|---|---|---|---|
| PN SSP | 44.0 | 22.0 | 21 | 57 | 11 | 12 | 194 | No Screen |
| RW 160 | 43.0 | 21.0 | 27 | 61 | 6 | 5 | 155 | No Screen |
| PN AS Trial #1 | 44.5 | 22.5 | 15 | 52 | 13 | 20 | 176 | No Screen |
| PN AS Trial #2 | 43.0 | 21.0 | 18 | 54 | 12 | 16 | 163 | No Screen |
| PN AS Trial #3 | 43.5 | 21.5 | 33 | 51 | 8 | 8 | 158 | No Screen |

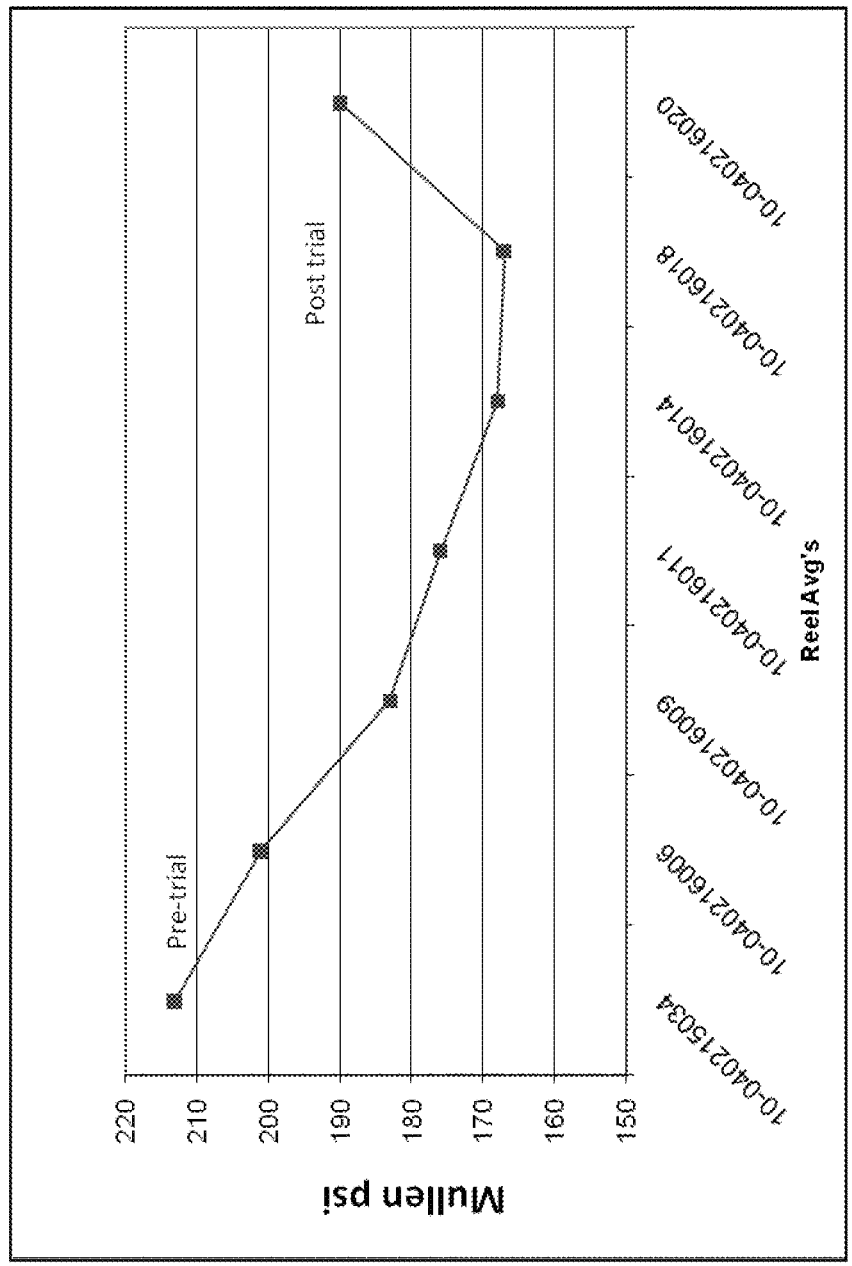
Figure 7: Anti-Stat Gen 2 Trial #1

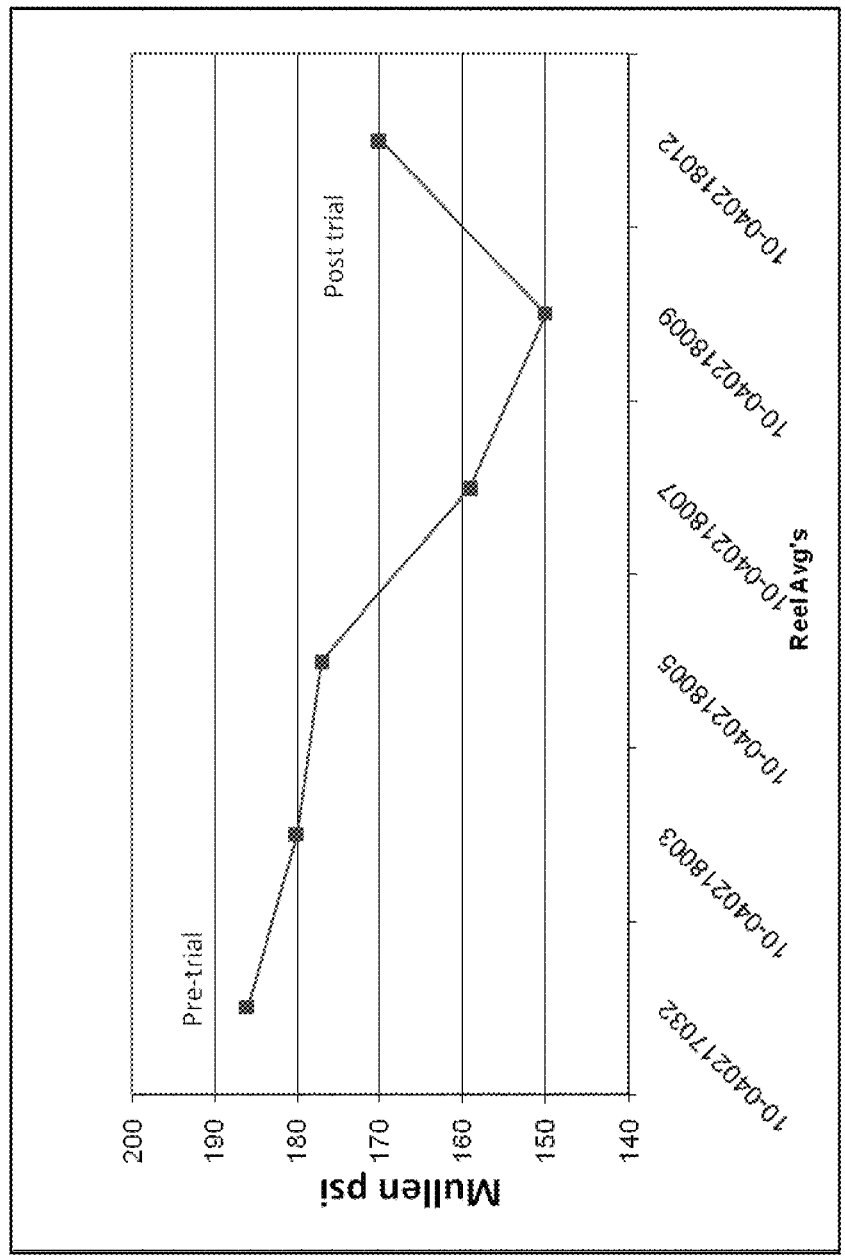
Figure 8: Anti-Stat Gen 2 Trial #2

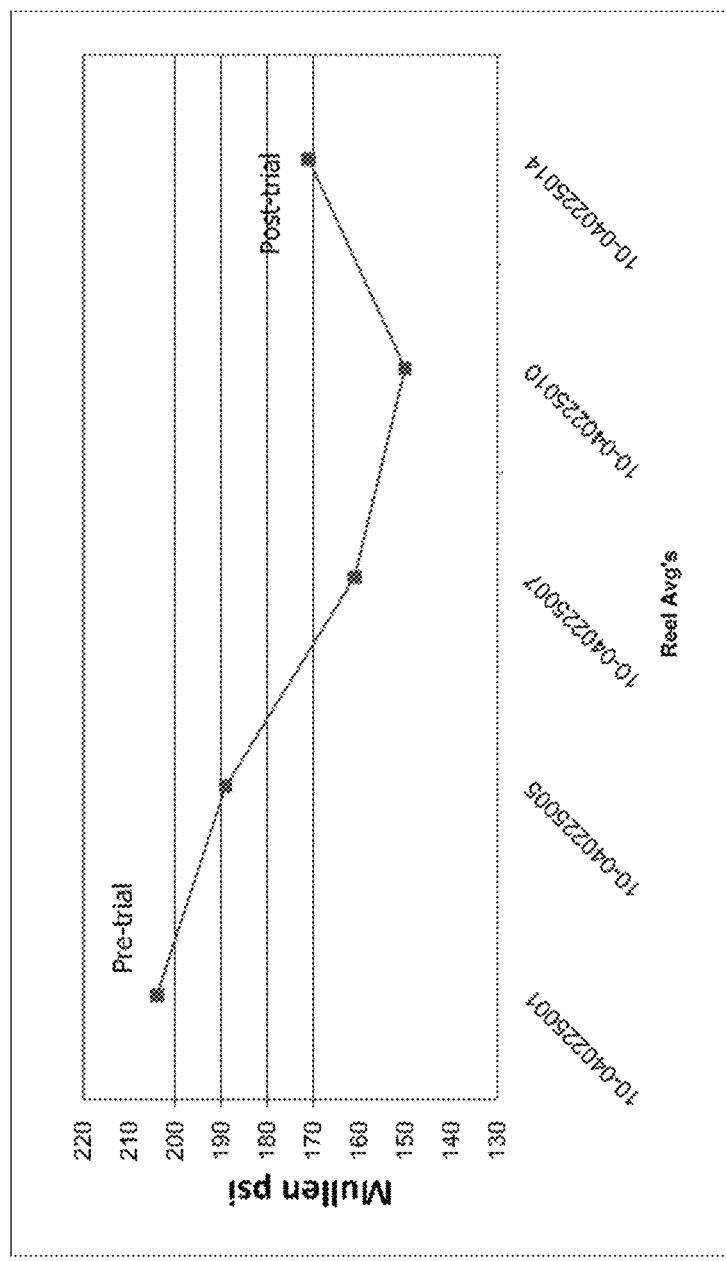
Figure 9: Anti-Stat Gen 2 Trial #3

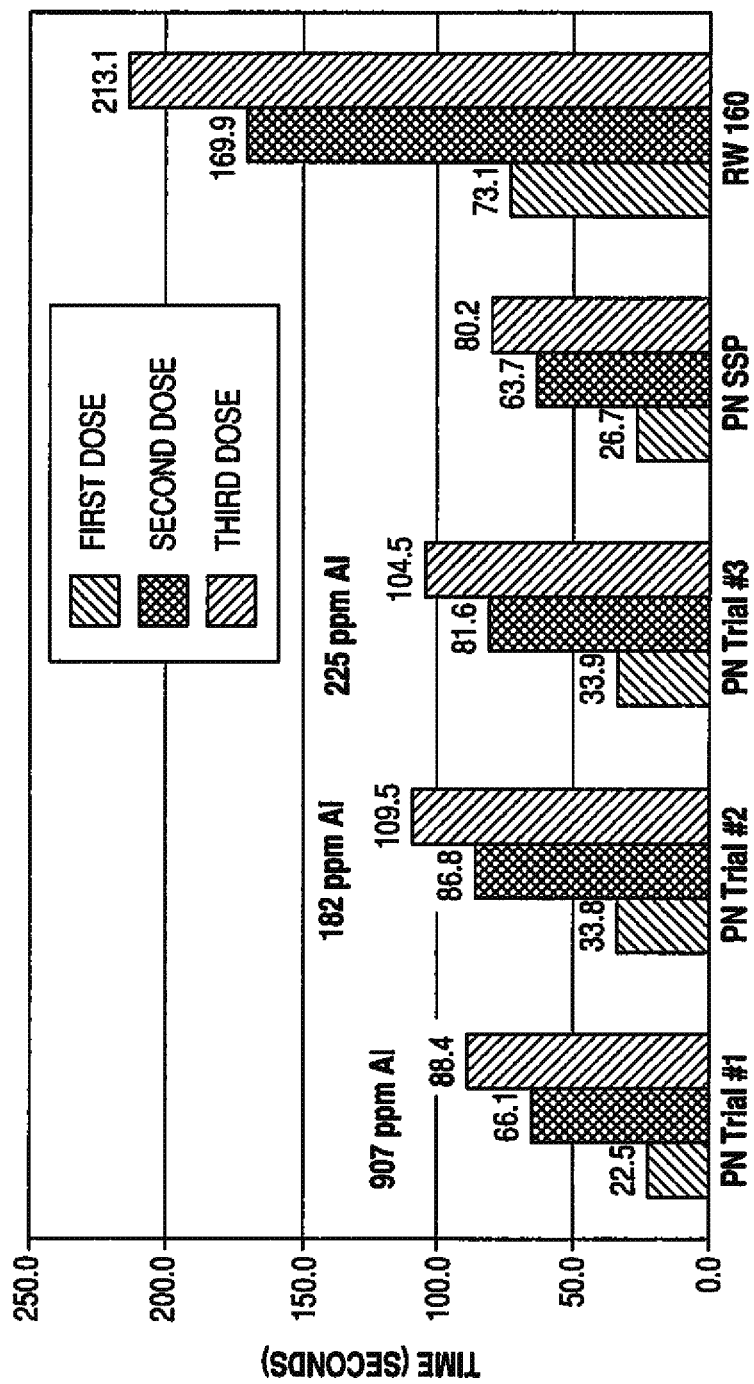

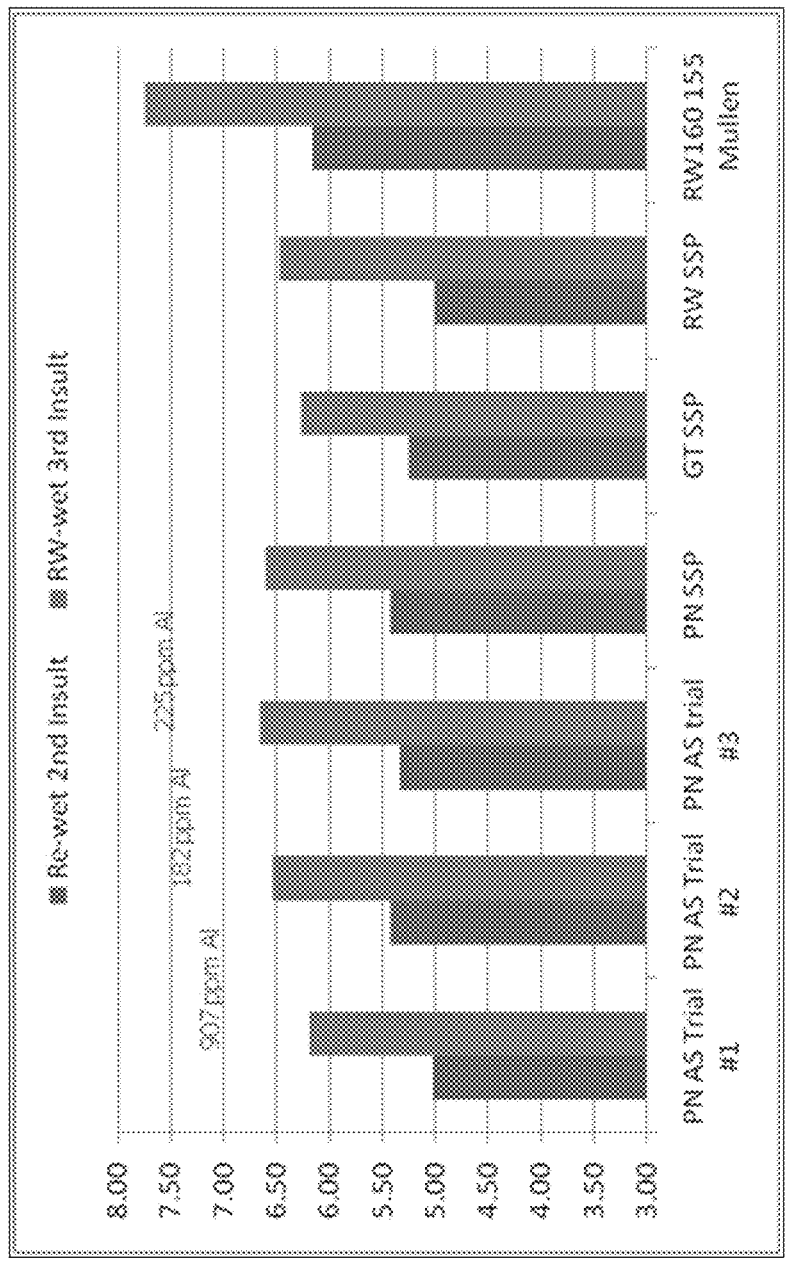
Figure 11: Multi-Dose Re-wet (separate samples for each dose)

Figure 12: Mill Trial #1 Shred Quality Data and Shred Energy HM1

| Sample ID | Shred Energy, kJ/kg | % Fines | % Good | % Fiber agglom. (Nits) | % Pieces | HB pH | Alum dose lbs/ton | F505 dose lbs/ton | Speed FPM |
|---|---|---|---|---|---|---|---|---|---|
| Trial control 10-040216001 | 151 | 16 | 47 | 19 | 18 | 3.4 | 0 | 0 | 225 |
| 1st Trial Reel 10-040216003 | 151 | 16 | 53 | 21 | 10 | 5.5 | 9.0 | 0 | 226 |
| 10-040216006 | 151 | 16 | 53 | 21 | 10 | 4.6 | 13.5 | 0.5 | 227 |
| 10-040216007 | 151 | 17 | 52 | 19 | 12 | 4.1 | 13.5 | 0.5 | 228 |
| 10-040216008 | 154 | 15 | 58 | 15 | 13 | 4.2 | 13.5 | 0.5 | 229 |
| 10-040216009 Table Vac Change | 149 | 15 | 48 | 18 | 19 | 4.3 | 11.3 | 0.5 | 234 |
| 10-040216010 | 151 | 18 | 57 | 18 | 7 | 5.0 | 11.3 | 0.5 | 238 |
| 10-040216011 | 146 | 15 | 50 | 21 | 15 | 4.6 | 11.3 | 1.0 | 240 |
| 10-040216012 | 148 | 15 | 51 | 21 | 14 | 4.4 | 11.3 | 1.0 | 240 |
| 10-040216013 | 148 | 16 | 51 | 19 | 14 | 4.2 | 11.3 | 1.0 | 240 |
| 10-040216014 | 141 | 15 | 47 | 18 | 20 | 4.3 | 11.3 | 1.0 | 240 |
| 10-040216015 | 140 | 15 | 49 | 18 | 19 | 4.2 | 13.5 | 1.0 | 240 |
| 10-040216016 Chemicals off | 151 | 17 | 52 | 16 | 15 | 4.8 | 0 | 0 | 235 |

Figure 13: Mill Trial #1 Shred Quality Data and Shred Energy HM1

| Sample ID | Shred Energy, kJ/kg | % Fines | % Good | % Fiber agglom. (Nits) | % Pieces | Spec. Vol., cc/g | Abs. Time, sec | Abs. Cap., g/g | Abs. Rate, cm/sec |
|---|---|---|---|---|---|---|---|---|---|
| Trial control 10-040216001 | 151 | 16 | 47 | 19 | 18 | 20.2 | 1.5 | 9.6 | 1.9 |
| 1st Trial Reel 10-040216003 | 151 | 16 | 53 | 21 | 10 | 20.8 | 1.9 | 9.6 | 2.0 |
| 10-040216006 | 151 | 16 | 53 | 21 | 10 | 20.0 | 1.4 | 9.4 | 2.0 |
| 10-040216007 | 151 | 17 | 52 | 19 | 12 | 20.7 | 1.4 | 9.6 | 1.9 |
| 10-040216008 | 154 | 15 | 58 | 15 | 13 | 20.1 | 1.7 | 9.6 | 2.0 |
| 10-040216009 | 149 | 15 | 48 | 18 | 19 | 19.8 | 1.6 | 9.5 | 2.1 |
| 10-040216010 | 151 | 18 | 57 | 18 | 7 | 20.4 | 1.6 | 9.4 | 1.8 |
| 10-040216011 | 146 | 15 | 50 | 21 | 15 | 19.5 | 1.8 | 9.4 | 1.9 |
| 10-040216012 | 148 | 15 | 51 | 21 | 14 | 20.8 | 1.9 | 9.5 | 1.9 |
| 10-040216013 | 148 | 16 | 51 | 19 | 14 | 20.0 | 1.8 | 9.4 | 2.2 |
| 10-040216014 | 141 | 15 | 47 | 18 | 20 | 19.7 | 1.2 | 9.2 | 1.7 |
| 10-040216015 | 140 | 15 | 49 | 18 | 19 | 19.7 | 1.4 | 9.3 | 1.7 |
| 10-040216016 Chemicals off | 151 | 17 | 52 | 16 | 15 | 20.0 | 1.7 | 9.4 | 2.0 |

Figure 14: Mill Trial #2 Shred Quality Data and Shred Energy HM1

| Sample ID | Shred Energy, kJ/kg | % Fines | % Good | % Fiber agglom. (Nits) | % Pieces | HB pH | Alum dose lbs/ton | F505 dose lbs/ton | Speed FPM |
|---|---|---|---|---|---|---|---|---|---|
| Trial control 10-040218001 | 149 | 16 | 48 | 19 | 17 | 3.5 | 0 | 0 | 230 |
| 1st Trial Reel 10-040218002 | 132 | 15 | 52 | 22 | 11 | 3.3 | 0 | 1.0 | 231 |
| 10-040218003 | 140 | 18 | 56 | 19 | 8 | 3.3 | 2.5 | 1.0 | 234 |
| 10-040218004 | 130 | 16 | 51 | 20 | 14 | 3.3 | 4.5 | 1.0 | 237 |
| 10-040218005 | 136 | 17 | 53 | 19 | 11 | 3.3 | 4.5 | 1.0 | 246 |
| 10-040218006 | 136 | 18 | 53 | 19 | 10 | 3.2 | 4.5 | 1.0 | 245 |
| 10-040218007 | 130 | 16 | 55 | 20 | 10 | 3.2 | 4.5 | 1.0 | 243 |
| After Trial 10-040218014 | 146 | 16 | 48 | 19 | 17 | 3.4 | 0 | 0 | 235 |

Figure 15: Mill Trial #2 Shred Quality Data and Shred Energy HM1

| Sample ID | Shred Energy, kJ/kg | % Fines | % Good | % Fiber agglom. (Nits) | % Pieces | Spec. Vol., cc/g | Abs. Time, sec | Abs. Cap., g/g | Abs. Rate, cm/sec |
|---|---|---|---|---|---|---|---|---|---|
| Trial control 10-040218001 | 149 | 16 | 48 | 19 | 17 | 18.9 | 1.7 | 9.3 | 1.9 |
| 1st Trial Reel 10-040218002 | 132 | 15 | 52 | 22 | 11 | 18.2 | 1.7 | 9.1 | 1.8 |
| 10-040218003 | 140 | 18 | 56 | 19 | 8 | 21.1 | 1.8 | 9.6 | 1.9 |
| 10-040218004 | 130 | 16 | 51 | 20 | 14 | 19.1 | 1.9 | 9.3 | 2.0 |
| 10-040218005 | 136 | 17 | 53 | 19 | 11 | 20.2 | 1.7 | 9.3 | 2.1 |
| 10-040218006 | 136 | 18 | 53 | 19 | 10 | 21.0 | 1.7 | 9.3 | 1.7 |
| 10-040218007 | 130 | 16 | 55 | 20 | 10 | 19.2 | 1.7 | 9.2 | 1.9 |
| After Trial 10-040218014 | 146 | 16 | 48 | 19 | 17 | 20.7 | 1.7 | 9.2 | 2.2 |

Figure 16: Fluff Testing Data on DSF Handsheets with Anti-Static Agents

| Sample ID | Shred Energy, kJ/kg | % Fines | % Good | % Fiber agglom. (Nits) | % Pieces | Spec. Vol., cc/g | Abs. Time, sec | Abs. Cap., g/g | Abs. Rate, cm/sec |
|---|---|---|---|---|---|---|---|---|---|
| Control PN | 185.8 | 26.8 | 68.2 | 4.5 | 0.5 | 21.3 | 2.6 | 9.6 | 1.3 |
| 505 1#/t | 175.7 | 24.1 | 71.7 | 3.8 | 0.4 | 21.2 | 2.1 | 9.9 | 1.6 |
| Alum 20#/t + 505 1#/t | 181.3 | 23.4 | 70.5 | 5.5 | 0.6 | 21.1 | 1.9 | 9.6 | 1.8 |
| 614 0.5#/t | 184.4 | 24.6 | 68.3 | 6.4 | 0.7 | 21.9 | 1.6 | 9.4 | 2.3 |
| 614 0.5#/t + 505 1#/t | 177.2 | 24.7 | 68.4 | 6.1 | 0.8 | 21.8 | 2.1 | 9.5 | 1.7 |
| 61067 Cpam 0.3#/t | 186.8 | 25.5 | 68.5 | 4.7 | 1.3 | 21.8 | 2.2 | 9.5 | 1.6 |

Figure 17: Sheet Properties on DSF Handsheets with Anti-Stat Additives

| Sample ID | Mullen PSI | Bulk cm³/g | Burst Index Mean kPa.m²/g |
|---|---|---|---|
| Control PN | 282 | 2.48 | 2.98 |
| 505 1#/t | 301 | 2.35 | 3.04 |
| Alum 20#/t + 505 1#/t | 270 | 2.55 | 2.76 |
| 614 0.5#/t | 280 | 2.45 | 2.82 |
| 614 0.5#/t + 505 1#/t | 277 | 2.53 | 2.85 |
| 61067 Cpam 0.3#/t | 285 | 2.49 | 2.88 |

COMPOSITION CONTAINING A MULTIVALENT CATIONIC METAL AND AMINE-CONTAINING ANTI-STATIC AGENT AND METHODS OF MAKING AND USING

BACKGROUND

Field of the Invention

The invention relates to fluff pulp sheets, compositions therefor, processes for making, and their use.

BRIEF DESCRIPTION OF THE FIGURES

Various embodiments are described in conjunction with the accompanying figures, in which:

FIGS. 2 and 3 show fluff properties and sheet properties for several exemplary and comparative embodiments.

FIG. 4 shows airlaid line shred energy and shred quality with 4 mm screen for several exemplary and comparative embodiments.

FIG. 5 shows airlaid line shred energy and shred quality with 8 mm screen for several exemplary and comparative embodiments.

FIG. 6 shows airlaid line shred energy and shred quality with no screen for several exemplary and comparative embodiments.

FIGS. 7, 8, and 9 show the results for Anti-Stat Gen 2 Trials 1, 2, and 3 for several exemplary and comparative embodiments.

FIG. 10 shows multi-dose acquisition data for several exemplary and comparative embodiments.

FIG. 11 shows the results for multi-dose re-wet for several exemplary and comparative embodiments.

FIGS. 12 and 13 show shred quality data and shred energy for data for mill trial #1 for several exemplary and comparative embodiments.

FIGS. 14 and 15 show shred quality data and shred energy for data for mill trial #2 for several exemplary and comparative embodiments.

FIG. 16 shows fluff testing data on DSF handsheets with anti-static agents for several exemplary and comparative embodiments.

FIG. 17 shows sheet properties on DSF handsheets with anti-stat additives for several exemplary and comparative embodiments.

DETAILED DESCRIPTION OF THE SEVERAL EMBODIMENTS

Figure 1:
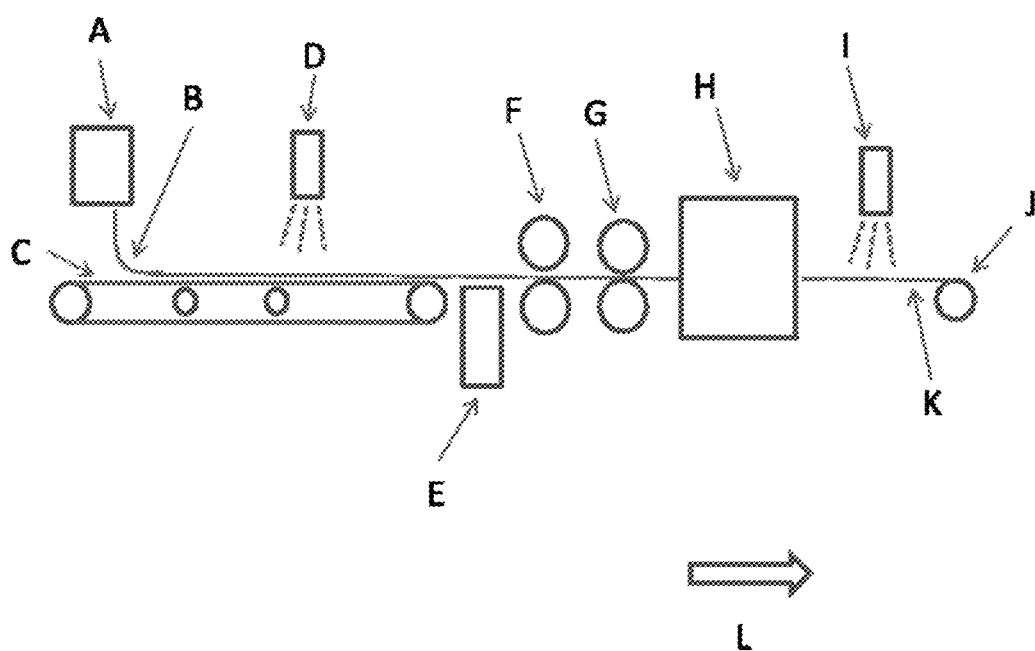
FIG. 1 shows a schematic example of one embodiment of a suitable papermaking machine, wherein A is a head box; B is a composition (e.g., fluff pulp mixture) applied to a table C from head box B; D is an optional formation shower; E is a suction box; F is a first press; G is a second press or transition to dryer H; I is an optional formation shower; J is a reel for taking up the finished fluff pulp sheet K; and L is an arrow showing the machine direction of the product as it progresses from head box A to reel J.

One embodiment of the subject matter described herein results in reduced entanglement of fiber in post fiberizer air streams. Another embodiment of the subject matter described herein results in improved core formation in light to medium weight cores. Another embodiment of the subject matter described herein results in improved penetration and absorption under load, for example, in applications such as wet wipes. Another embodiment of the subject matter described herein results in inhibited microbial and/or bacterial growth. Another embodiment of the subject matter described herein results in pitch control. Another embodiment of the subject matter described herein results in significantly reduced operational risk, e.g., sheet breaking, in the manufacture of fluff pulp sheets. Another embodiment of the subject matter described herein results in improved fluff shred quality of fluff pulp sheets. Another embodiment of the subject matter described herein results in improved fluff fiber singulation of fluff pulp sheets. Another embodiment of the subject matter described herein results in reduced fiberization energy of fluff pulp sheets. Another embodiment of the subject matter described herein results in good Mullen values of fluff pulp sheets. Another embodiment of the subject matter described herein results in a fluff pulp sheet with reduced fiberization energy but which maintains good Mullen value. Another embodiment of the subject matter described herein is a fluff pulp sheet having improved surfactant retention. Another embodiment of the subject matter described herein is a fluff pulp sheet or absorbent product obtained therefrom having improved absorbency and low absorption times. In one embodiment, the fluff pulp sheet can be processed at high speeds without sheet breaks or other processing issues. In another embodiment, the subject matter described herein avoids the disadvantages of conveying a mechanically weak sheet through a paper machine.

One embodiment relates to a fluff pulp or other pulp, comprising a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof; an amine-containing anti-static agent; and pulp.

In one embodiment, the multivalent cationic metal ion is one or more of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof. In another embodiment, the multivalent cationic metal ion is one or more of $Al^{+3}$, $B^{+3}$, $Cu^{+3}$, water-soluble salt thereof, or combination thereof. In another embodiment, the multivalent cationic metal ion is $Al^{+3}$ or water-soluble salt thereof or combination thereof. The salt is not particularly limited, and any suitable anion known to form a salt with the multivalent cationic metal ion should suffice. For example, the anion may be organic, inorganic, fatty acid, acetate, lactate, EDTA, halide, chloride, bromide, nitrate, chlorate, perchlorate, sulfate, acetate, carboxylate, hydroxide, nitrite, or the like, or combinations thereof.

The salt may be a simple salt, wherein the metal forms a salt with one or more of the same anion, or a complex salt, wherein the metal forms a salt with two or more different anions. In one embodiment, the salt is aluminum chloride, aluminum carbonate, aluminum sulfate or alum.

Amine-containing anti-static agents are known in the fluff pulp and fluff pulp fiber arts. Any amine-containing anti-static agent is suitable for use in the present application, and the selection thereof is within the skill of one knowledgeable in the fluff pulp and fluff pulp fiber arts given the teachings herein. In one embodiment, the amine-containing anti-static agent comprises or is a polymer comprising a plurality of amine groups and having a degree of polymerization of less than 300. Some examples, which are not intended to be limiting, include linear or branched monoalkyl amine, linear or branched dialkyl amine, linear or branched tertiary alkyl amine, linear or branched quaternary alkyl amine, fatty acid amide quaternary ammonium salt, dialkyl dimethyl quaternary ammonium salt, dialkylimidazolinium quaternary ammonium salt, dialkyl ester quaternary ammonium salt, triethanolamine-ditallow fatty acid, fatty acid ester of ethoxylated primary amine, ethoxylated quaternary ammonium salt, coco alkyl dimethylbenzyl ammonium chloride, polyquaternary amine, commercially available compound having CAS Registry No. 61789-71-7; commercially available EKA Soft F505 available from Eka Chemicals Inc., Marietta, Ga., USA, commercially available compound having CAS Registry No. 68585-79-9, commercially available EKA Soft F614 available from Eka Chemicals Inc., Marietta, Ga., USA, and the like, alone, or in any combination.

In one embodiment, the amine-containing anti-static agent comprises or is a polymer comprising a plurality of amine groups and having a degree of polymerization of less than 300. This range includes all values and subranges therebetween, including less than 300, 299, 290, 285, 275, 260, 250, 225, 200, 199, 195, 190, 180, 175, 150, 125, 100, 75, 50, 25, 10, 5, 2, or any combination thereof.

In one embodiment, the web comprises a solids content of >1% by weight. This range includes all values and subranges therein, including 100, 99, 98, 97, 96, 95, 94, 93, 92, 91, 90, 85, 80, 75, 70, 65, 60, 55, 50, 45, 40, 35, 30, 25, 20, 15, 10, 9, 8, 7, 6, 5, 4, 3, 2, >1%, or any combination thereof or range therein.

The web may have a moisture content of between 0 and 70%. This range includes all values and subranges therebetween, including 0, 0.1, 0.2, 0.3, 0.4, 0.5, 0.6, 0.7, 0.8, 0.9, 1, 2, 3, 4, 5, 6, 7, 8, 9, 10, 12, 14, 16, 18, 20, 25, 30, 35, 40, 45, 50, 55, 60, 65, 70% or any combination thereof or range therein. In one embodiment, the web may have a moisture content of ≤70%. In another embodiment, the web may have a moisture content of ≤50%. In another embodiment, the web may have a moisture content of ≤25%. In another embodiment, the web may have a moisture content of ≤10%. In another embodiment, the web may have a moisture content of ≤7%. In another embodiment, the web may have a moisture content of about 6.3%. The web may be suitably dried to achieve the desired moisture content according to known methods.

In one embodiment, the web may have a basis weight ranging from 100 to 1100 gsm. This range includes all values and subranges therein, for example 100, 125, 150, 175, 200, 225, 250, 275, 300, 400, 500, 600, 700, 800, 900, 1000, 1100, or any combination thereof or range therein.

One embodiment relates to a method for making fluff pulp or other pulp, comprising contacting a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof; an amine-containing anti-static agent; and pulp.

In one embodiment, the amine-containing anti-static agent is used neat or as purchased. In another embodiment, the amine-containing anti-static agent is used in combination with one or more second amine-containing anti-static agent. In another embodiment, the amine-containing anti-static agent is applied from a solution, dispersion, emulsion, or the like. If used in solution, dispersion, emulsion, or the like, or combination thereof. In one embodiment, if used in solution, dispersion, emulsion, or the like, the amine-containing anti-static agent concentration may suitably range from 1 to 50% by weight solids content of amine-containing anti-static agent to the weight of solution, dispersion, emulsion, or the like. This range includes all values and subranges therebetween, including 0.5, 1, 2, 3, 4, 5, 6, 7, 8, 9, 10, 11, 12, 13, 14, 15, 16, 17, 18, 19, 20, 25, 30, 35, 40, 45, 50%, or any combination thereof or range therein.

In one embodiment, the amine-containing anti-static agent is in the form of a composition further comprising water and optionally one or more pH adjusting agent, whitener, colorant, pigment, optical brightening agent, wetting agent, binder, bleaching agent, trivalent cationic metal, alum, other additive, or a combination thereof. If present, the amount of additive is not particularly limited. In one embodiment, the additive may be present in amounts ranging from about 0.005 to about 50 weight percent based on the weight of the amine-containing anti-static agent composition. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, and 50 weight percent, or any combination thereof, based on the weight of the amine-containing anti-static agent composition.

Given the teachings herein, and the knowledge of one skilled in the fluff pulp papermaking arts, one can easily determine the method of contacting the amine-containing anti-static agent with the fluff pulp fibers, and the amount, composition, temperature, residence time, and the like, to carry out the subject matter claimed herein. For example, if desired, the total amount of amine-containing anti-static agent in the fluff pulp mixture, web and/or in the finished fluff pulp sheet may be optionally increased or decreased or otherwise controlled by controlling the various points of addition. For example, the amount of amine-containing anti-static agent contacted with the first mixture at the wet end to the may be optionally increased or decreased by respectively decreasing or increasing any amount applied, if desired, at the web, the dry end, or both. Further, if desired, one or more than one of the same or different type of amine-containing anti-static agent, or any combination thereof, may be applied at any point in the process.

In one embodiment, the finished fluff pulp sheet may be fiberized or shredded, in accordance with methods known in the art. For example, the fiberizing or shredding may be carried out in a hammermill.

In one embodiment, the fluff pulp sheet and/or fiberized or shredded fluff pulp sheet, or a combination thereof may be suitably incorporated into one or more of an adsorbent product, paper product, personal care product, medical product, insulating product, construction product, structural material, cement, food product, veterinary product, packaging product, diaper, tampon, sanitary napkin, gauze, bandage, fire retardant, or a combination thereof. These products and methods for their manufacture and use are well known to those of ordinary skill in the art.

Another embodiment relates to a fluff pulp sheet, comprising:

a web comprising fluff pulp fibers;

at least one multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof; and at least one amine-containing anti-static agent.

In one embodiment, the fluff pulp sheet has a fiberization energy, sometimes called the shred energy, of less than 145 kJ/kg. This range includes all values and subranges therebetween, including 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145 kJ/kg, or any combination thereof or any range therein. In one embodiment, the fiberization energy of the fluff pulp sheet is less than 135 kJ/kg. In another embodiment, the fiberization energy of the fluff pulp sheet is from 120 to less than 145 kJ/kg. In another embodiment, the fiberization energy of the fluff pulp sheet is less than 120 kJ/kg. In another embodiment, the fiberization energy of the fluff pulp sheet is from 100 to 120 kJ/kg. In another embodiment, the fiberization energy of the fluff pulp sheet is less than 100 kJ/kg. In another embodiment, the fiberization energy of the fluff pulp sheet is less than 95 kJ/kg.

In one embodiment, the fluff pulp sheet has a SCAN-C 33:80 adsorption time of <4.0 s. This range includes all values and subranges therebetween, including 1, 1.1, 1.2, 1.3, 1.4, 1.5, 1.6, 1.7, 1.8, 1.9, 2, 2.0, 2.1, 2.2, 2.3, 2.4, 2.5, 2.6, 2.7, 2.8, 2.9, 3, 3.0, 3.1, 3.2, 3.3, 3.4, 3.5, 3.6, 3.7, 3.8, 3.9, <4.0 s, or any range therein.

In one embodiment, the fluff pulp sheet on screen fractionation has a % Good of ≥50%. This range includes all values and subranges therebetween, including 50, 55, 60, 65, 70, 75, 80, 85, 90, 95, 100%, or any range therein.

In one embodiment, the fluff pulp sheet on screen fractionation has a % Fines of ≤40%. This range includes all values and subranges therebetween, including 1, 2, 3, 4, 5, 6, 7, 8, 9, 10, 15, 20, 25, 30, 35, 40%, or any combination thereof or any range therein.

In one embodiment, the fluff pulp sheet on screen fractionation has a % Pieces of ≤30%. This range includes all values and subranges therebetween, including 1, 2, 3, 4, 5, 6, 7, 8, 9, 10, 15, 20, 25, 30%, or any combination thereof or any range therein.

In one embodiment, the fluff pulp sheet has a Mullen of ≥90 psi. This range includes all values and subranges therebetween, including 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250 psi, and higher, or any range therein.

In one embodiment, the fluff pulp sheet contains the amine-containing anti-static agent in an amount of ≥1 lb solids amine-containing anti-static agent per ton of the fluff pulp fibers. This range includes all values and subranges therebetween, including 1, 1.1, 1.2, 1.3, 1.4, 1.5, 1.6, 1.7, 1.8, 1.9, 2, 2.0, 2.1, 2.2, 2.3, 2.4, 2.5, 2.6, 2.7, 2.8, 2.9, 3, 3.0, 3.1, 3.2, 3.3, 3.4, 3.5, 3.6, 3.7, 3.8, 3.9, 4, 4.0, 5, 5.0, 6, 7, 8, 9, 10, 15, 20 lb solids amine-containing anti-static agent per ton of the fluff pulp fibers, and higher, or any combination thereof or any range therein. In one embodiment, if more than one amine-containing anti-static agent is used, this range is the total amount over all the amine-containing anti-static agents present in the fluff pulp sheet.

In one embodiment, the multivalent cationic metal ion, salt thereof, or combination thereof is present in the fluff pulp sheet in an amount of ≥1 lb per ton of fluff pulp fibers. This range includes all values and subranges therebetween, including 1, 1.1, 1.2, 1.3, 1.4, 1.5, 1.6, 1.7, 1.8, 1.9, 2, 2.0, 2.1, 2.2, 2.3, 2.4, 2.5, 2.6, 2.7, 2.8, 2.9, 3, 3.0, 3.1, 3.2, 3.3, 3.4, 3.5, 3.6, 3.7, 3.8, 3.9, 4, 4.0, 5, 5.0, 6, 7, 8, 9, 10, 15, 20, 25, 30, 35 lb multivalent cationic metal ion, salt thereof, or combination thereof per ton of the fluff pulp fibers, or any combination thereof or any range therein. In one embodiment, if more than one multivalent cationic metal ion, salt thereof, or combination thereof is used, this range is the total amount over all the multivalent cationic metal ion, salt thereof, or combination thereof present in the fluff pulp sheet.

In one embodiment, the multivalent cationic metal ion is present in the fluff pulp sheet in an amount ≥150 ppm. This range includes all values and subranges therebetween, including 150, 155, 160, 165, 170, 175, 180, 185, 190, 195, 200, 205, 210, 215, 220, 225, 230, 235, 240, 245, 250, 300, 330, 400, 450, 500, 550, 750, and 1000 ppm, and higher, or any combination thereof or any range therein.

In one embodiment, the fluff pulp sheet has a moisture content of 25% or less. This range includes all values and subranges therebetween, including 0, 0.1, 0.2, 0.3, 0.4, 0.5, 0.6, 0.7, 0.8, 0.9, 1, 2, 3, 4, 5, 6, 7, 8, 9, 10, 12, 14, 16, 18, 20, 25%, or any combination thereof or range therein. In another embodiment, the fluff pulp sheet has a moisture content of 20% or less. In another embodiment, the fluff pulp sheet has a moisture content of 10% or less. In another embodiment, the fluff pulp sheet has a moisture content of 7% or less. In another embodiment, the fluff pulp sheet has a moisture content of about 6.3%.

In one embodiment, the fluff pulp sheet has a density of 0.5 to 0.75 g/cc. This range includes all values and subranges therebetween, including 0.5, 0.55, 0.6, 0.65, 0.7, and 0.75 g/cc, or any range therein.

In one embodiment, the fluff pulp sheet has a caliper of 20 to 70 mm. This range includes all values and subranges therebetween, including 20, 25, 30, 35, 40, 45, 50, 55, 60, 65, 70 mm, and any range therein.

In one embodiment, the fluff pulp sheet may have a basis weight ranging from 100 to 1100 gsm. This range includes all values and subranges therein, for example 100, 125, 150, 175, 200, 225, 250, 275, 300, 400, 500, 600, 700, 800, 900, 1000, 1100, or any combination thereof or range therein.

Another embodiment relates to an adsorbent product, paper product, personal care product, medical product, insulating product, construction product, structural material, cement, food product, veterinary product, packaging product, diaper, tampon, sanitary napkin, gauze, bandage, fire retardant, or a combination thereof, comprising the fluff pulp sheet and/or fiberized or shredded fluff pulp sheet, or a combination thereof.

Another embodiment relates to the use of an adsorbent product, paper product, personal care product, medical product, insulating product, construction product, structural material, cement, food product, veterinary product, packaging product, diaper, tampon, sanitary napkin, gauze, bandage, fire retardant, or a combination thereof, comprising the fluff pulp sheet and/or fiberized or shredded fluff pulp sheet, or a combination thereof.

Fluff pulp and fluff pulp fibers are known in the papermaking art. Any fluff pulp or fluff pulp fiber is suitable for use in the present application, and the selection thereof is within the skill of one knowledgeable in the fluff pulp and fluff pulp fiber arts. One or more than one, or any combination thereof, of fluff pulp and/or fluff pulp fibers may be used. The fluff pulp and fluff pulp fibers may be treated or untreated, and they may optionally contain one or more than one additives, or combination thereof, which are known in the art. Given the teachings herein, the level of treatment, if desired, and the amount of additives may be readily determined by one of ordinary skill in the fluff pulp and fluff pulp fiber arts.

Similarly, the formation of a web of fluff pulp or fluff pulp fibers or from a fluff pulp mixture or furnish onto a table from a headbox in a papermaking machine is within the skill of one knowledgeable in the fluff pulp and fluff pulp fiber arts.

The type of fluff pulp or fluff pulp fiber suitable for use herein is not intended to be limiting. Fluff pulp typically includes cellulosic fiber. The type of cellulosic fiber is not critical, and any such fiber known or suitable for use in fluff pulp paper can be used. For example, the fluff pulp can made from pulp fibers derived from hardwood trees, softwood trees, or a combination of hardwood and softwood trees. The fluff pulp fibers may be prepared by one or more known or suitable digestion, refining, and/or bleaching operations such as, for example, known mechanical, thermomechanical, chemical and/or semichemical pulping and/or other well known pulping processes. The term, "hardwood pulps" as may be used herein include fibrous pulp derived from the woody substance of deciduous trees (angiosperms) such as birch, oak, beech, maple, and eucalyptus. The term, "softwood pulps" as may be used herein include fibrous pulps derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached fluff pulp fiber may be utilized. Recycled fluff pulp fibers are also suitable for use.

The fluff pulp sheet may suitably contain from 1 to 99 wt % of fluff pulp fibers based upon the total weight of the fluff pulp sheet. In one embodiment, the fluff pulp sheet may contain from 5 to 95 wt % of fluff pulp fibers based upon the total weight of the fluff pulp sheet. These ranges include any and all values and subranges therebetween, for example, 1, 5, 10, 15, 20, 25, 30, 35, 40, 45, 50, 55, 60, 65, 70, 75, 80, 85, 90, 95 and 99 wt %.

The fluff pulp sheet may optionally contain from 1 to 100 wt % fluff pulp fibers originating from softwood species based upon the total amount of fluff pulp fibers in the fluff pulp sheet. In one embodiment, the fluff pulp sheet may contain 10 to 60 wt % fluff pulp fibers originating from softwood species based upon the total amount of fluff pulp fibers in the fluff pulp sheet. These ranges include 1, 2, 5, 10, 15, 20, 25, 30, 35, 40, 45, 50, 55, 60, 65, 70, 75, 80, 85, 90, 95, and 100 wt % and any and all ranges and subranges therein, based upon the total amount of fluff pulp fibers in the fluff pulp sheet.

All or part of the softwood fibers may optionally originate from softwood species having a Canadian Standard Freeness (CSF) of from 300 to 750. In one embodiment, the fluff pulp sheet contains fluff pulp fibers from a softwood species having a CSF from 400 to 550. These ranges include any and all values and subranges therebetween, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

The fluff pulp sheet may optionally contain from 1 to 100 wt % fluff pulp fibers originating from hardwood species based upon the total amount of fluff pulp fibers in the fluff pulp sheet. In one embodiment, the fluff pulp sheet may contain from 30 to 90 wt % fluff pulp fibers originating from hardwood species, based upon the total amount of fluff pulp fibers in the fluff pulp sheet. These ranges include 1, 2, 5, 10, 15, 20, 25, 30, 35, 40, 45, 50, 55, 60, 65, 70, 75, 80, 85, 90, 95, and 100 wt %, and any and all values and subranges therein, based upon the total amount of fluff pulp fibers in the fluff pulp sheet.

All or part of the hardwood fibers may optionally originate from hardwood species having a Canadian Standard Freeness of from 300 to 750. In one embodiment, the fluff pulp sheet may contain fibers from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

The fluff pulp sheet may optionally contain less refined fluff pulp fibers, for example, less refined softwood fibers, less refined hardwood, or both. Combinations of less refined and more refined fibers are possible. In one embodiment, the fluff pulp sheet contains fibers that are at least 2% less refined than that of fluff pulp fibers used in conventional fluff pulp sheets. This range includes all values and subranges therebetween, including at least 2, 5, 10, 15, and 20%. For example, if a conventional fluff pulp sheet contains fibers, softwood and/or hardwood, having a Canadian Standard Freeness of 350, then, in one embodiment, the fluff pulp sheet may contain fibers having a CSF of 385 (i.e. refined 10% less than conventional).

When the fluff pulp sheet contains both hardwood fluff pulp fibers and softwood fluff pulp fibers, the hardwood/softwood fluff pulp fiber weight ratio may optionally range from 0.001 to 1000. In one embodiment, the hardwood/softwood ratio may range from 90/10 to 30/60. These ranges include all values and subranges therebetween, including 0.001, 0.002, 0.005, 0.01, 0.02, 0.05, 0.1, 0.2, 0.5, 1, 2, 5, 10, 15, 20, 25, 30, 35, 40, 45, 50, 55, 60, 65, 70, 75, 80, 85, 90, 95, 100, 200, 300, 400, 500, 600, 700, 800, 900, and 1000.

The softwood fibers, hardwood fibers, or both may be optionally modified by physical and/or chemical processes to obtain the fluff pulp. Examples of physical processes include, but are not limited to, electromagnetic and mechanical processes. Examples of electrical modifications include, but are not limited to, processes involving contacting the fibers with an electromagnetic energy source such as light and/or electrical current. Examples of mechanical modifications include, but are not limited to, processes involving contacting an inanimate object with the fibers. Examples of such inanimate objects include those with sharp and/or dull edges. Such processes also involve, for example, cutting, kneading, pounding, impaling, and the like, and combinations thereof.

Nonlimiting examples of chemical modifications include conventional chemical fiber processes such as crosslinking and/or precipitation of complexes thereon. Other examples of suitable modifications of fibers include those found in U.S. Pat. Nos. 6,592,717, 6,592,712, 6,582,557, 6,579,415, 6,579,414, 6,506,282, 6,471,824, 6,361,651, 6,146,494, H1,704, 5,731,080, 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, the entire contents of each of which are hereby incorporated, independently, by reference.

Some examples of fluff, which are not intended to be limiting, include those commercially available RW Supersoft™, Supersoft L™, RW Supersoft Plus™, GT Supersoft Plus™, RW Fluff LITE™, RW Fluff 110™, RW Fluff 150™, RW Fluff 160™, GP 4881™, GT Pulp™, RW SSP™, GP 4825™, alone, or in any combination.

As discussed herein, if desired, additives such as pH adjusting agent, whitener, colorant, pigment, optical brightening agent, wetting agent, binder, bleaching agent, trivalent cationic metal, alum, other additive, or a combination thereof may be utilized. Such compounds are known in the art and otherwise commercially available. Given the teachings herein, one of ordinary skill in the fluff pulp and fluff pulp papermaking arts would be able to select and use them as appropriate. If present, the amount of additive is not particularly limited. In one embodiment, the additive may be present in amounts ranging from about 0.005 to about 50 weight percent based on the weight of the fluff pulp sheet. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, and 50 weight percent, or any combination thereof, based on the weight of the finished fluff pulp sheet.

One or more optical brightening agents may be optionally present. Typically, the optical brightening agents are fluorescent dyes or pigments that absorb ultraviolet radiation and reemit it at a higher wavelengths in the visible spectrum (blue), thereby effecting a white, bright appearance to the paper sheet when added to the stock furnish, but any optical brightening agent may be used. Examples of optical brighteners include, but are not limited to azo dyestuffs/copper complex cationic dye, azoles, biphenyls, coumarins, furans, stilbenes, ionic brighteners, including anionic, cationic, and anionic (neutral) compounds, such as the Eccobrite™ and Eccowhite™ compounds available from Eastern Color & Chemical Co. (Providence, R.I.); naphthalimides; pyrazenes; substituted (e.g., sulfonated) stilbenes, such as the Leucophor™ range of optical brighteners available from the Clariant Corporation (Muttenz, Switzerland), and Tinopal™ from Ciba Specialty Chemicals (Basel, Switzerland), Cartasol Blue KRL-NA™ from Clariant (Charlotte, N.C.), CAS No. 7440-50-8, CAS No. 64-19-7; salts of such compounds including but not limited to alkali metal salts, alkaline earth metal salts, transition metal salts, organic salts and ammonium salts of such brightening agents; and combinations of one or more of the foregoing agents.

Examples of optional fillers include, but are not limited to, clay, calcium carbonate, calcium sulfate hemihydrate, and calcium sulfate dehydrate, chalk, GCC, PCC, and the like.

Examples of optional binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional substances include, but are not limited to silicas such as colloids and/or sols. Examples of silicas include, but are not limited to, sodium silicate and/or borosilicates.

The composition may optionally and additionally include one or more pigments. Non-limiting examples of pigments include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, colloidal silica, colloidal alumina slurry, modified calcium carbonate, modified ground calcium carbonate, modified precipitated calcium carbonate, or a mixture thereof.

In one embodiment, the modified calcium carbonate is modified ground calcium carbonate, modified precipitated calcium carbonate, or a mixture thereof. Here, the term, "modified" is sometimes referred to as "structured". These types of pigments are known to those skilled in the papermaking art.

The contents of U.S. Provisional Application 61/231,481, filed Aug. 5, 2009, are incorporated herein by reference.

One embodiment relates to a process for making a fluff pulp sheet, comprising:

contacting the multivalent cationic metal ion, salt thereof, or combination thereof with a composition comprising fluff pulp fibers and water at a first pH, to form a first mixture;

contacting at least one amine-containing anti-static agent with the first mixture and raising the pH to a second pH, which is higher than the first pH, to form a fluff pulp mixture;

forming a web from the fluff pulp mixture; and drying the web, to make the fluff pulp sheet.

In one embodiment, the multivalent cationic metal ion, salt thereof, or combination thereof is contacted with a composition comprising fluff pulp fibers and water at a first pH. In preparing this first mixture, the order of contacting is not particularly limited. To prepare a fluff pulp mixture, the first mixture and amine-containing anti-static agent are contacted and the pH is raised to a second pH, which is higher than the first pH. The order of contacting and raising the pH in preparing the fluff pulp mixture is not particularly limited. Once prepared, the fluff pulp mixture may be formed into a single or multi-ply web on a papermaking machine such as a Fourdrinier machine or any other suitable papermaking machine known in the art. The basic methodologies involved in making fluff pulp sheets on various papermaking machine configurations are well known to those of ordinary skill in the art and accordingly will not be described in detail herein. In one embodiment, the fluff pulp mixture or fluff pulp fibers may have the form of a relatively low consistency aqueous slurry of the pulp fibers optionally together with one or more additives. In one embodiment, the fluff pulp mixture or fluff pulp fibers slurry is ejected from a head box onto a table, e.g., a porous endless moving forming sheet or wire, where the liquid, e.g., water, is gradually drained through small openings in the wire, optionally with the aid of one or more suction boxes, until a mat of pulp fibers and optionally the other materials is formed on the wire. If desired, additional amine-containing anti-static agent, which may be the same or different than that already present in the fluff pulp mixture may be applied to the web at any point along the table, for example, by spraying. In one embodiment, the still-wet web is transferred from the wire to a wet press where more fiber-to-fiber consolidation occurs and the moisture is further decreased. In one embodiment, the web is then passed to a dryer section to remove a portion, most of or all of the retained moisture and further consolidate the fibers in the web. After drying, the web or fluff pulp sheet may be further treated with one or more of the same or different amine-containing anti-static agent, or any combination thereof with a formation shower, spray boom, or the like. If desired, after the dried web or fluff pulp sheet exits the last drying section, additional amine-containing anti-static agent may be applied to the dried web or fluff pulp sheet.

The precise location where the respective compositions are contacted, applied, or the like is may depend on the specific equipment involved, the exact process conditions being used and the like. These are easily determined given the teachings herein combined with the knowledge of one of ordinary skill in the papermaking art.

In one embodiment, the first mixture further comprises one or more additive such as whitener, colorant, pigment, optical brightening agent, wetting agent, binder, bleaching agent, other additive, or a combination thereof. If present, the amount of additive is not particularly limited. In one embodiment, the additive may be present in amounts ranging from about 0.005 to about 50 weight percent based on the weight of the first mixture. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, and 50 weight percent, or any combination thereof, based on the weight of the first mixture.

In one embodiment, the multivalent cationic metal ion, salt thereof, or combination thereof is contacted with the composition at a first pH in order to at least partially solublize the multivalent cationic metal ion, salt thereof, or combination thereof.

In one embodiment, aluminum salts are added before the amine-containing anti-static agent at a pH below 5.0. The amine-containing anti-static agent may be added to the mixture and the pH is increased to >5.0 as the sheet forms. Without wishing to be bound by theory, it is possible that the aluminum is ion exchanged on the cellulosic fluff fibers, and very little free alum is present in the final dried sheet, which significantly reduces dust and deposits during fiberization.

The contents of U.S. Provisional Application 61/231,457, filed Aug. 5, 2009, are incorporated herein by reference.

One embodiment relates to a process for making a fluff pulp sheet, comprising:

contacting at least one multivalent cationic metal ion, salt thereof, or combination thereof with a composition comprising fluff pulp fibers and water at a first pH, to form a fluff pulp mixture;

forming a web from the fluff pulp mixture; and applying at least one amine-containing anti-static agent to the web and raising the pH to a second pH, which is higher than the first pH, to make the fluff pulp sheet.

In one embodiment, the multivalent cationic metal ion, salt thereof, or combination thereof is contacted with a composition comprising fluff pulp fibers and water at a first pH. In preparing this fluff pulp mixture, the order of contacting is not particularly limited. Once prepared, the fluff pulp mixture may be formed into a single or multi-ply web on a papermaking machine such as a Fourdrinier machine or any other suitable papermaking machine known in the art. The basic methodologies involved in making fluff pulp sheets on various papermaking machine configurations are well known to those of ordinary skill in the art and accordingly will not be described in detail herein. In one embodiment, the fluff pulp mixture or fluff pulp fibers may have the form of a relatively low consistency aqueous slurry of the pulp fibers optionally together with one or more additives. In one embodiment, the fluff pulp mixture or fluff pulp fibers slurry is ejected from a head box onto a table, e.g., a porous endless moving forming sheet or wire, where the liquid, e.g., water, is gradually drained through small openings in the wire, optionally with the aid of one or more suction boxes, until a mat of pulp fibers and optionally the other materials is formed on the wire. The amine-containing anti-static agent is applied to the web and the pH is raised to a second pH, which is higher than the first pH. The order of applying the amine-containing anti-static agent and raising the pH is not particularly limited. In one embodiment, the amine-containing anti-static agent is applied by spraying it from, for example, a formation shower at any point along the table. In one embodiment, the still-wet web is transferred from the wire to a wet press where more fiber-to-fiber consolidation occurs and the moisture is further decreased. In one embodiment, the web is then passed to a dryer section to remove a portion, most of or all of the retained moisture and further consolidate the fibers in the web. After drying, the web or fluff pulp sheet may be further treated with one or more of the same or different amine-containing anti-static agent, or any combination thereof with a formation shower, spray boom, or the like. If desired, after the dried web or fluff pulp sheet exits the last drying section, additional amine-containing anti-static agent may be applied to the dried web or fluff pulp sheet.

The precise location where the respective compositions are contacted, applied, or the like is may depend on the specific equipment involved, the exact process conditions being used and the like. These are easily determined given the teachings herein combined with the knowledge of one of ordinary skill in the papermaking art.

In one embodiment, the multivalent cationic metal ion, salt thereof, or combination thereof is contacted with the composition at a first pH in order to at least partially solublize the multivalent cationic metal ion, salt thereof, or combination thereof.

In one embodiment, alum is added to the stock before the web is formed and spraying on the amine-containing anti-static agent. In another embodiment, the amine-containing anti-static agent and alum are present in the stock, the web is formed, and then additional amine-containing anti-static agent is applied.

Another embodiment relates to a fluff pulp sheet, made by the process described herein.

In one embodiment, the forming comprises one or more of contacting the fluff pulp mixture with a table in a papermaking machine, removing at least a portion of water from the fluff pulp mixture with a suction box under a table in a papermaking machine, or a combination thereof.

In one embodiment, aluminum salts are added in amounts of 0.2-100 g/kg with an amine-containing anti-static agent (for example, linear amine, branched amine, quaternary amine) that produces fluff pulp sheet having a low fiberization energy (<145 kJ/kg), good shred quality (e.g., Johnson Nit >90% good) and absorption properties improved over amine-containing anti-static agent alone.

In one embodiment, the first pH is <5.0. This range includes all values and subranges therebetween, including 1, 2, 2.5, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and <5 or any value therein.

In one embodiment, the second pH is ≥5.0. This range include all values and subranges therebetween, including 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7, 8, 9, 10, 11 or any value therein.

In one embodiment, an additional amine-containing anti-static agent may be additionally and optionally applied to the web. If desired, the amine-containing anti-static agent may be suitably sprayed onto the web, for example using a formation shower or spray boom over the table, coated onto the web using known coating methods in the papermaking arts, or the web may be immersed into the amine-containing anti-static agent. Combinations of application methods are possible. The thus-applied second amine-containing anti-static agent may be the same or different from the amine-containing anti-static agent applied at the wet end with the multivalent cationic metal ion, salt thereof, or combination thereof.

In one embodiment, the optional second amine-containing anti-static agent is sprayed onto the web.

In one embodiment, the spraying is carried out using one or more formation showers over a table in a papermaking machine.

The web may be suitably dried in a drying section. Any method for drying commonly known in the art of fluff pulp papermaking may be utilized. The drying section may include and contain a drying can, flotation dryer, cylinder drying, Condebelt drying, IR, or other drying means and mechanisms known in the art. The fluff pulp sheet may be dried so as to contain any selected amount of water.

In one embodiment, the web is dried using a flotation dryer.

In one embodiment, an amine-containing anti-static agent may further and optionally be applied to the fluff pulp sheet. If applied, the thus-applied third amine-containing anti-static agent may be the same or different from the amine-containing anti-static agent applied at the wet end or the second amine-containing anti-static agent optionally applied to the web. In one embodiment, the third amine-containing anti-static agent is applied to the fluff pulp sheet after the last drying step. In one embodiment the second amine-containing anti-static agent is applied to the fluff pulp sheet before the sheet is taken up on the reel. The third amine-containing anti-static agent may be suitably applied by spraying, for example, from a second formation shower or spray boom located at the dry end.

In one embodiment, the contacting of the first mixture with the amine-containing anti-static agent is carried out before, during, or after the raising of the pH to the second pH, or a combination thereof. The pH may be suitably raised, for example, by the addition of one or more known pH adjusters to the first mixture before, during, or after contacting the first mixture with the amine-containing anti-static agent. Optionally, the pH may be further adjusted by applying one or more pH adjusters to the web using a formation shower, spray boom, or the like, or a combination thereof.

EXAMPLES

The claimed subject matter may be described in further detail with reference to the following examples. The examples are intended to be illustrative, but the claimed subject matter is not considered as being limited to the materials, conditions, or process parameters set forth in the examples. All parts and percentages are by unit weight unless otherwise indicated.

Example 1

Study Method Used

A large batch of never dried softwood pulp fibers were mixed with mill white water to form a 0.6% solids slurry. This mixture was used for a series of anti-stat tests. Pad permeability was used to select best formulations. Higher pad permeability was assumed to be due to lower fiber bonding. The best formulations were selected and formed into lab handsheets for fluff testing. The unit, "#/t" is pounds per ton. The fluff properties and sheet properties are shown in FIGS. 2 and 3.

Example 1

Discussion

It is possible to reduce shred energy and sheet Mullen by 10% while obtaining good shred quality. The combination of 505 with alum is best formulation due to no change in core or fiber absorbency.

Example 2

Mill Trial 1

A first mill trial was carried out. Alum and F505 were added with a range of addition form 9 to 13.5 lbs/ton for alum and 0 to 1 lbs/ton for F505 with headbox pH range of 4.1 to 5.5. Machine speed increased 15 FPM during the trial. Fiberization energy dropped >10 kj/kg when F505 dose was increase from 0.5 to 1.0 lbs/ton. Shred quality was better at higher Alum dose with lower F505 dose (Alum dose ranged from 9 to 13.5 lbs/ton). Residual Variability reduced significantly with high alum and low F505 dose. Sheet mullen dropped ~20 PSI when higher F505 dose was used. No reduction in absorption properties has been detected by Scan or Multi Acquisition (Insult) test method. Alum retention was high with headbox pH of 4.4; Alum appears to reduce insult times.

Example 3

Mill Trial 2

A second mill trial was run. Alum and F505 were added with a range of addition form 0 to 4.5 lbs/ton for alum and 1 lbs/ton for F505 with headbox pH range of 3.2 to 3.4. Machine speed increased 12 FPM (9 reel average machine speed before trial was 230 FPM-9 reel average during trial is 242 FPM). Fiberization energy dropped >10 kj/kg. Shred quality improved slightly, but most importantly it did not reduce. Sheet mullen dropped 26 PSI (9 reel average before trial was 186 PSI-9 reel average during trial 161). No reduction in absorption properties has been detected by Scan method and slight increase in absorption times were detected by Insult testing cores. Broke mass was limited to see affect of chemistry. Chemical dose was optimized to reduce shred energy and sheet Mullen; BW residual variability did not change.

Example 4

Mill Trial 3

A third mill trial was run. Alum and F505 were added with a range of addition form 4 to 6 lbs/ton for alum and 0.5 to 1 lbs/ton for F505 with headbox pH range of 3.4 to 3.0. Sheet Mullen dropped 50 PSI from Pre-trial reel and 20 PSI from Post-trial reel Machine speed increased 12 FPM. Headbox pH dropped too low during trial (3.0 pH); Broke mass was limited to see affect of chemistry; No reduction in BW residual variability was detected.

FIG. 4 shows airlaid line shred energy and shred quality with 4 mm screen. FIG. 5 shows airlaid line shred energy and shred quality with 8 mm screen. FIG. 6 shows airlaid line shred energy and shred quality with no screen. PN SSP has no chemical addition, RW 160 is a slightly treated grade, PN AS Trial #'s 1, 2, and 3 is product produce during trial condition above. FIGS. 4 and 5 show the anti-stat trial product has reduced fiberization energy and good shred quality. FIG. 6 shows that the anti-stat trial product has reduced fines content but RW 160 has the best shred quality under very poor fiberization conditions.

FIGS. 7, 8, and 9 show the results for Anti-Stat Gen 2 Trials 1, 2, and 3. FIG. 10 shows multi-dose acquisition data. It was found that no significant insult time change was induced by the anti-stat, and that alum appeared to reduce insult time slightly. PN SSP has no chemical addition, RW 160 is a slightly treated grade, PN AS Trial #'s 1, 2, and 3 is product produce during trial condition above.

FIG. 11 shows the results for multi-dose re-wet, in which separate samples are shown for each dose. It was found that no significant re-wet increase was induced by the anti-stat, and that alum appeared to reduced the re-wet slightly. PN SSP has no chemical addition, RW 160 is a slightly treated grade, GT SSP has no chemical addition, PN AS Trial #'s 1, 2, and 3 is product produce during trial condition above.

FIG. 12 shows Mill Trial 1 Shred Quality Data and Shred Energy HM1. Alum and F505 were added with a range of addition form 9 to 13.5 lbs/ton for alum and 0 to 1 lbs/ton for F505 with headbox pH range of 4.1 to 5.5. It was found that increasing F505 dose from 0.5 to 1.0 lbs/ton reduced shred energy, and that a higher dose of F505 was not needed for machine speed increase.

FIG. 13 shows Mill Trial #1 Shred Quality Data and Shred Energy HM1. No change in Scan absorption detected during trial. Alum and F505 were added with a range of addition form 9 to 13.5 lbs/ton for alum and 0 to 1 lbs/ton for F505 with headbox pH range of 4.1 to 5.5.

FIG. 14 shows Mill Trial #2 Shred Quality Data and Shred Energy HM1. It was shown that fiberization energy reduced during trial, and that shred quality slightly improved. Alum and F505 were added with a range of addition form 0 to 4.5 lbs/ton for alum and 1 lbs/ton for F505 with headbox pH range of 3.2 to 3.4.

FIG. 15 shows Mill Trial #2 Shred Quality Data and Shred Energy HM1. It was found that no change in scan absorption was detected during trial. Alum and F505 were added with a range of addition form 0 to 4.5 lbs/ton for alum and 1 lbs/ton for F505 with headbox pH range of 3.2 to 3.4.

Discussion Anti-Stat Fluff Properties Optimization

High Alum and low F505: Smaller reduction in shred energy; smaller reduction in sheet Mullen; significant improvement in BW residual variability; improved shred quality; and faster machine speed.

Low Alum and High F505: Larger reduction in shred energy; larger reduction in sheet Mullen; no improvement in BW residual variability; no shred quality improvement; and slower machine speed.

The addition of F505 results in reduced fiberization energy; reduced sheet Mullen; slight to no change in shred quality; slight reduction to no impact in absorption. The addition of F614 results in no change in fiberization energy; no change in sheet Mullen; improved shred quality; and no impact on absorption. The addition of alum results in a small reduction fiberization energy; a small reduction in sheet Mullen; a slight improvement in shred quality; and improved absorption.

FIG. 16 shows fluff testing data on DSF handsheets with anti-static agents. DSF sheets were produced and tested to understand how the anti-stat additives perform with nearly perfect sheet formation. Less nits and pieces are formed when shredding DSF handsheets, and shred energy is lower. The Alum+505 and 505 alone have the greatest drop in shred energy.

FIG. 17 shows the sheet properties on DSF handsheets with anti-stat additives. The difference in Burst Index is less between samples in this study, but the same trend was seen. Alum+505 had the lowest burst index.

Handsheets

Handsheets for determining fluff pulp properties (Basis weight is 155#/1000 sq. feet or 757 gsm) may be formed as follows.

Equipment required for handsheet forming includes a 12" Williams handsheet former consisting of forming tank with wire insert, lower drain tank, and RO water supply source; British disintegrator; Bucket with pouring spout (13 L), Spatula; Stainless steel couching roller, 13 inch width; 12"× 12" inch blotters; Dake press; Rotating drum dryer; and Flat dryer.

Sheetmaking Procedure: (1) Close black valve below forming tank (horizontal position); fill forming tank with enough fresh RO water to cover wire screen to a level about 2 inches above screen. Release trapped air by pressing hose to wire in a corner while filling. (2) Weigh out 60 g OD pulp and transfer to British disintegrator. (3) Add 2 L RO water, set disintegrator to 3000 revolutions (1500 revs/min.), and disperse the pulp. (4) Transfer to bucket, dilute to ~8-9 liters, mix well with spatula. (5) Carefully pour the pulp slurry into forming tank. Add additional fresh RO water until the water level is about 1"-2" from the top. Use the force of the water to mix and distribute fibers evenly, by moving the hose rapidly back and forth across surface; avoid splashing. Allow the fibers to settle. Open the black valve and allow water to drain from sheet. (6) Open the mold and place four 12 in. sq. blotters on top of the sheet (smooth side facing sheet). Move the roller back and forth 12 passes. (Note: Avoid applying excessive pressure on the roller during couching; it will cause sheet to stick to blotter/wire). (7) Remove blotters. Carefully peel back the blotter in contact with the fiber mat so that fibers do not adhere to the blotter. Use a spatula to loosen the front edge of the mat from the wire if necessary, then slowly pick up the sheet from the wire. (8) Lay the wet handsheet on top of a stack of six dry 12 in. sq. blotters, smooth side facing the mat. Lay 6 more blotters on top of the formed sheet, always facing the smooth side of the blotter towards the formed sheet. Continue forming handsheets in this manner, with six blotters on top of last sheet. Press stacks of 6-12 handsheets at a time.

Pressing procedure and conditions: Pressing: Dake press (6-12 handsheets/set). (1) Place handsheet stack on bottom plate. Center stack and align upper and bottom plates. (2) Turn the breaker panel on. (3) Close the red valve on left side of press by turning clockwise (do not over tighten—gently close until it stops turning). (4) Push both black buttons simultaneously and raise plates. Stop and realign plates if necessary. Continue to raise until desired pressure is reached (see pressing conditions below). (5) Maintain the pressure at desired time by quickly hitting black buttons or manually pumping hand pump. (6) Open red valve to release pressure (do not turn all the way counter clockwise—just need to open until pressure is released). (7) After second press, remove handsheets and dry to ~7% moisture. Pressing Conditions: (1) Press handsheet stack in Dake press @ 10,000 psi for 1 minute. (2) Remove from press. Replace wet blotters, 3 dry blotters on bottom, then handsheet, then 5 blotters between each handsheet, and finally, 3 on top of last handsheet. Press the stack at 20,000 psi for 30 seconds. Drying sheet procedure: (1) Preheat the drum dryer to ~215° F. and flat dryer to 200° F. (2) Pass handsheets through the drum dryer. Guide sheets so that they don't bend back as they reenter the roller. Flip sheets over during drying procedure. Use a stainless steel plate at the exiting nip to release the sheet, then carefully guide the sheet off the drum. Avoid bending the sheet. (3) Dry to approximately 70 g, then place handsheet on flat dryer and continue drying to target weight, turning sheet and rechecking weight often to avoid over drying. Target weight is 64.5 g+/−0.7 (range 63.8 to 65.2). Recommend starting with clean equipment—rinse forming tank and wire mold with fresh RO water.

The tests were carried out in accordance with the following:

Scan Absorption Test

The Scan Absorption Test can determine absorption properties of fluff pulp pads. The method is based on the Scandinavian standard SCAN-C 33:80, the entire contents of which are hereby incorporated by reference. Fluff volume (bulk), absorption rate and absorption capacity are measured by placing a test pad on the unit, applying a uniform load and allowing the pad to absorb liquid from below until saturated. The apparatus is SCAN Absorption Tester consisting of a test piece former, absorption unit, and timing device. Reagents include 0.9% saline (NaCl) solution.

Procedure: (1) Prepare saline solution, 0.9% sodium chloride in DI water (e.g., 180 g/20 L) and transfer to saline delivery carboy. (2) Rinse electrode platen and blot dry with wipe; rinse screen and reservoir to remove residue, dry and replace in tester. Open valve on carboy and run saline through until it flows into overflow pail. Close valve. If necessary, stabilize the instrument by running a few samples before analyzing test samples. (3) Mix fluff by vigorously shaking inflated sample bag. Weigh out approximately 3.20 g of fluff pulp (take several small portions throughout the bag to get a representative sample). (4) Tare the forming tube (the plexiglass cylindrical mold with 50 mm base screen) and place securely on pad former (make sure it's firmly seated on gasket). Turn on vacuum and carefully feed the pulp into the former in small amounts, allowing fibers to separate as much as possible. Avoid feeding in clumps of pulp. (5) After pad has been formed turn off vacuum and remove mold/screen assembly. Place tared assembly with pad on balance and remove excess pulp to give a final weight of 3.00 g+/−0.01. Arrange pulp as needed to give uniform thickness. Fibers sometimes build up on one side in tube, especially if high in nits. Remove from this area first to get the 3.00 g, then rearrange as needed, carefully lifting mat/fibers to the thinner area. Gently tamp down the moved fibers to give a uniform thickness. Prepare 6-8 pads per sample. (6) Setup computer. Enter ID and sample wt (i.e., 3.00 g). (7) Pre-wet the SCAN tester sample basket and use wipe to remove excess. Lower the electrode platen and click "Zero" on the computer to zero height sensor. Raise and latch the electrode platen. (8) Remove bottom screen from forming tube. Place plexi tube on the SCAN wire basket; gently lower the electrode platen (with the load on top of shaft) onto the pad, carefully raise the mold (hold in place), click "Start" on computer to start the timer on computer screen, then swing holder over and rest the tube on it. Avoid touching the wires and shaft with the tube. Watch the screen and start the saline flow at about 18-20 seconds. When prompted (at 30 sec), raise the reservoir in one even motion, and hold in place. When prompted, carefully lower the reservoir, close the saline valve and allow pad to drain. When prompted "test over", raise the electrode platen up through the former tube. If pad sticks to the platen, gently tap with edge of tube to release pad onto the basket. Latch the electrode platen, remove forming tube and carefully transfer pad to a balance. Record wet weight. Enter wet pad weight in computer. Record the dry height (caliper, mm), specific volume (cc/g), absorption time (sec) and wet weight on spreadsheet. Report absorption time (sec), absorption rate (cm/sec), specific volume (g/cc), and capacity (g/g). Run 6-10 tests per sample. Report averages and SD.

Four Screen Fractionation of Shredded Fluff Pulp

The Four Screen Fractionation of Shredded Fluff Pulp test can determine the size distribution of fibers in dry shredded pulp. A moving high velocity air stream disperses shredded pulp in a covered standard testing sieve while individual fibers are removed through the wire mesh by an applied vacuum. The amount of fluff retained on the sieve wire is determined by weight. The fiber is subjected to fractionation through a series of sieves with consecutively increasing hole openings. The fractions are calculated as a percentage of the original whole fluff weight. The apparatus includes pulp fluff air turbulence generator and separator; USA Standard Testing Sieves: 8" diameter×2" height; USA Std #200 (75 µm hole opening); USA Std #50 (300 µm hole opening); USA Std #14 (1400 µm hole opening); USA Std #8 (2360 µm hole opening. This test must be conducted in a controlled room, 48% to 52% relative humidity, 70° F. to 72° F.

Procedure: (1) Condition shredded pulp at least 4 hrs in the test room. Mix the fluff in the plastic bag by hand and by vigorously shaking the sealed bag which contains air space, to achieve as uniform a distribution of fiber fractions as possible, i.e., to achieve a representative test sample. (2) Take pulp from various areas of the bag, and weigh out 5 grams (+/−0.01 grams). Record weight, and place on a tared #200 sieve. Place sieve on the fluff fractionator and cover. Seal the seam formed by the sieve with the large rubber gasket. This allows a more uniform distribution of the air/vacuum. (3) Set timer for 5 minutes and start the fractionator by turning knob to "auto". Adjust the compressed air to 30 psi and the vacuum to 4 inches using the three holed circular plexiglass adjustment device. (If necessary, intermittently check vacuum/air psi as they may drift). The fines will pass through the sieve into the vacuum. At the end of the set time period, the unit shuts off automatically. When finished, remove the sieve. Remove the cover and weigh the sieve plus the pulp on the tared balance. Record the weight of pulp remaining on the #200 sieve. The mass of the fines is the difference in the mass of the pulp before and after fractionation. (4) Tare the #50 sieve and transfer the pulp from step 3 on to the #50 sieve, cover, place on fractionator and seal as in step 2. Set timer for 5 minutes. Reset the start by turning the knob to off, then back to auto. Start fractionator and proceed as in step 3 (adjust air and vacuum as needed). Record the weight of the pulp retained on the #50 screen. (5) Tare the #14 sieve and transfer the pulp from the #50 on to the #14 sieve, cover, place on fractionator and seal as in step 2. Set timer for 5 minutes. Reset the start by turning the knob to off, then back to auto. Start fractionator and proceed as in step 3 (adjust air and vacuum as needed). Record weight of the pulp retained on the #14 screen. (6) Transfer the pulp from the #14 to the #8 screen. Repeat the process above (5 minutes, 30 psi, vacuum at 4 in.) and record the weight of pulp retained on the #8.

Calculations: For the calculations, (1) Original fluff weight; (2) Weight remaining on #200; (3) Weight remaining on #50; (4) Weight remaining on #14; and (5) Weight remaining on #8.

$$\text{Percent passing } \#200 = \{(1)-(2)\}/(1) \times 100 = \%\text{Fines}$$

$$\text{Percent retained on } \#200 = \{(2)-(3)\}/(1) \times 100 = \%\text{Good}$$

$$\text{Percent retained on } \#50 = \{(3)-(4)\}/(1) \times 100 = \%\text{Good}$$

$$\text{Percent retained on } \#14 = \{(4)-(5)\}/(1) \times 100 = \%\text{Nits}$$
(fiber agglomerates)

$$\text{Percent retained on } \#8 = (5)/(1) \times 100 = \%\text{Pieces}$$

Percent passing #200 is reported as Fines. Percent retained on #200 screen, but passing #50 is reported as Good. Percent retained on #50, but passing #14 is reported as Good. (Total Good is sum of the two good fractions). Percent retained on #14 screen, but passing #8 screen is reported as Nits (fiber agglomerates). Percent retained on #8 screen is reported as Pieces. It is recommended to run a minimum of three tests per sample.

Fluff Pulp Shredding

For fluff pulp shredding, the Kamas hammermill is a simulation of commercial equipment manufactured and supplied by Kamas Industri AB for use in the production of fluff pulp products. Like the commercial equipment it has variable rotor speed, variable pulp feed speed and exchangeable screens. Pulp strips are hand fed into the mill and are defiberized with free swinging hammers until the resultant fluff is sufficiently broken up to pass through the screen holes.

Fluff Testing Room: Controlled conditions, 72° F. and 55% (+/−5) relative humidity; Apparatus: Kamas Type H 01 Laboratory Defribrator.

Sample Preparation: Condition pulp sheets in the testing room for at least 4 hours. For lab formed sheets, trim about ½" from edges. Cut pulp sheets (in machine direction) into strips, 5-10 strips/sample, 2 inches wide. Record weights.

Procedure: (1) Clean dust bag if necessary (air flow when running should be 32.5-35 L/sec.; lower air flow indicates dust bag needs cleaning). (2) Turn on main power switch.

Wait for green light to illuminate on safety interlock switch and open rotor housing door (Note: rotor motor is locked out when green light is on; door will not open unless the green light is on). Ensure that milling chamber is clean and desired screen is properly inserted. Close and lock door with tightening knob. (3) Open door on collection chamber (below main rotor upper housing) and make sure the collection funnel/screen is clean and securely in place. Close and latch door. (4) Set rotor to 3300 rpm, feed to ~15 cm/sec, time to 7 seconds, and use 10 mm screen unless otherwise specified. Pressing the function ("F") button scrolls through settings. Set test time, using + and − keys to increase or decrease. (5) Adjust main motor (rotor) and feed speed using manual potentiometer dials on right side of front panel. The actual speed is shown on the LED display when rotor or feeder are in motion. Use the "+" and "−" keys to start/stop rotor or feeder. Press "+" and manually adjust potentiometer to give desired rotor speed. Once setting is achieved, lock potentiometer knob using toggle below the dial and press "−" to stop. Set the feed rate in the same manner. Note: When feed rate is displayed, pressing "+" moves the feeder forward and "−" reverses the feed. On computer desktop screen, click on "Cell Mill" and open data collection file. Minimize and open spreadsheet. Enter the strip weights. Return to the Cell mill screen, data tab, click on File, "Receive" to ready the computer for data collection. (6) On the Kamas, press function key to scroll. Start the rotor by pressing "+" on the motor page. (7) Scroll to the test page; the display will read "START TEST". Press "+" to start the test. (8) The feeder automatically starts and the measuring procedure automatically begins when power consumption increases. Feed the pulp strip into the mill in machine direction and wire side down. The energy will be automatically measured and displayed. Press the "−" key. i.e., "printout" to transfer data to computer. Click on data tab, make sure weight entry is correct and record the energy reading. Files may be saved if desired. To collect data from the next sample, click on "file", "receive". (9) Using function key enter "new test", scroll with function key to "start test" and enter. Feed in the next sample strip and repeat process above. (10) Collect the shredded pulp in the screen receptor funnel below the shredding chamber—maximum capacity is ~4 twelve inch strips. Stop the rotor and empty fluff into plastic bag. Mix by hand, then seal bag and shake vigorously to get a homogenous fluff mix. Clean chamber and collection funnel between samples using vacuum cleaner.

As used throughout, ranges are used as a short hand for describing each and every value that is within the range, including all subranges therein.

Numerous modifications and variations on the present invention are possible in light of the above teachings. It is, therefore, to be understood that within the scope of the accompanying claims, the invention may be practiced otherwise than as specifically described herein.

What is claimed is:

1. A fluff pulp or other pulp, comprising:
   (a) a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof;
   (b) an amine-containing anti-static agent comprising one or more of: a dialkyl ester quaternary ammonium salt, a triethanolamine-ditallow fatty acid, fatty acid ester of an ethoxylated primary amine, an ethoxylated quaternary ammonium salt, or a coco alkyl dimethylbenzyl ammonium chloride; and
   (c) pulp.

2. The pulp of claim 1, wherein the amine-containing anti-static agent comprises one or more of: a dialkyl ester quaternary ammonium salt, a triethanolamine-ditallow fatty acid, fatty acid ester of an ethoxylated primary amine, an ethoxylated quaternary ammonium salt.

3. The pulp of claim 1, wherein the amine-containing anti-static agent comprises a dialkyl ester quaternary ammonium salt.

4. The pulp of claim 1, wherein the amine-containing anti-static agent comprises a triethanolamine-ditallow fatty acid.

5. The pulp of claim 1, wherein the amine-containing anti-static agent comprises a fatty acid ester of an ethoxylated primary amine.

6. The pulp of claim 1, wherein the amine-containing anti-static agent comprises an ethoxylated quaternary ammonium salt.

7. The pulp of claim 1, wherein the multivalent cationic metal ion is selected from the group consisting of $Al^{+3}$, $B^{+3}$, $Cu^{+3}$, water-soluble salt thereof, or combination thereof.

8. The pulp of claim 1, wherein the multivalent cationic metal ion is selected from the group consisting of $Al^{+3}$, $B^{+3}$, water-soluble salt thereof, or combination thereof.

9. The pulp of claim 1, wherein the multivalent cationic metal ion is $Al^{+3}$, water-soluble salt thereof, or combination thereof.

10. The pulp of claim 1, wherein the multivalent cationic metal ion is water-soluble salt of $Al^{+3}$.

11. The pulp of claim 1, wherein the multivalent cationic metal ion comprises alum.

12. The pulp of claim 1, wherein the multivalent cationic metal ion is alum.

13. A method of making the pulp of claim 1, comprising contacting:
   (a) a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof;
   (b) an amine-containing anti-static agent comprising one or more of: a dialkyl ester quaternary ammonium salt, a triethanolamine-ditallow fatty acid, fatty acid ester of an ethoxylated primary amine, an ethoxylated quaternary ammonium salt, or a coco alkyl dimethylbenzyl ammonium chloride; and
   (c) pulp.

14. An article in the form of an absorbent product, paper product, personal care product, medical product, insulating product, construction product, structural material, cement, food product, veterinary product, packaging product, diaper, tampon, sanitary napkin, gauze, bandage, fire retardant, or a combination thereof, comprising the pulp of claim 1.

15. A method of making the article of claim 14, comprising:
   contacting:
   (a) a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof;
   (b) an amine-containing anti-static agent comprising one or more of: a dialkyl ester quaternary ammonium salt, a triethanolamine-ditallow fatty acid, fatty acid ester of an ethoxylated primary amine, an ethoxylated quaternary ammonium salt, or a coco alkyl dimethylbenzyl ammonium chloride; and
   (c) pulp; to make a fluff pulp mixture;
   forming a web from the fluff pulp mixture; and
   drying.

16. A process for making a fluff pulp sheet, comprising:
   contacting a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof with a composition comprising fluff pulp fibers and water at a first pH, to form a first mixture;

contacting at least one amine-containing anti-static agent with the first mixture and raising the pH to a second pH, which is higher than the first pH, to form a fluff pulp mixture, wherein the at least one amine-containing anti-static agent comprises one or more of: a dialkyl ester quaternary ammonium salt, a triethanolamine-ditallow fatty acid, fatty acid ester of an ethoxylated primary amine, an ethoxylated quaternary ammonium salt, or a coco alkyl dimethylbenzyl ammonium chloride;

forming a web from the fluff pulp mixture; and drying the web, to make the fluff pulp sheet.

17. The process of claim 16, wherein the forming comprises one or more of contacting the fluff pulp mixture with a table in a papermaking machine, removing at least a portion of water from the fluff pulp mixture with a suction box under a table in a papermaking machine, or a combination thereof.

18. The process of claim 16, wherein the first pH is <5.0, and wherein the second pH is ≥5.0.

19. A process for making a fluff pulp sheet, comprising:

contacting a multivalent cationic metal ion selected from the group consisting of $Al^{+3}$, $B^{+3}$, $Mn^{+2}$, $Cu^{+2}$, $Cu^{+3}$, $Zn^{+2}$, $Sn^{+2}$, $Sn^{+4}$, water-soluble salt thereof, or combination thereof with a composition comprising fluff pulp fibers and water at a first pH, to form a fluff pulp mixture;

forming a web from the fluff pulp mixture; and applying at least one amine-containing anti-static agent to the web and raising the pH to a second pH, which is higher than the first pH, to make the fluff pulp sheet, wherein the at least one amine-containing anti-static agent comprises one or more of: a dialkyl ester quaternary ammonium salt, a triethanolamine-ditallow fatty acid, fatty acid ester of an ethoxylated primary amine, an ethoxylated quaternary ammonium salt, or a coco alkyl dimethylbenzyl ammonium chloride.

20. The process of claim 19, wherein the forming comprises one or more of contacting the fluff pulp mixture with a table in a papermaking machine, removing at least a portion of water from the fluff pulp mixture with a suction box under a table in a papermaking machine, or a combination thereof.

21. The process of claim 19, wherein the first pH is <5.0, wherein the first pH is raised to second pH after formation of the web, and wherein the second pH is ≥5.0.

* * * * *